(12) United States Patent
Santilli

(10) Patent No.: US 7,780,924 B2
(45) Date of Patent: Aug. 24, 2010

(54) PLASMA-ARC-FLOW APPARATUS FOR SUBMERGED LONG LASTING ELECTRIC ARCS OPERATING UNDER HIGH POWER, PRESSURE AND TEMPERATURE CONDITIONS TO PRODUCE A COMBUSTIBLE GAS

(75) Inventor: Ruggero Maria Santilli, Palm Harbor, FL (US)

(73) Assignee: Magnegas Corporation, Tarpon Springs, FL (US)

( * ) Notice: Subject to any disclaimer, the term of this patent is extended or adjusted under 35 U.S.C. 154(b) by 1077 days.

(21) Appl. No.: 11/474,687

(22) Filed: Jun. 26, 2006

(65) Prior Publication Data
US 2007/0297954 A1    Dec. 27, 2007

(51) Int. Cl.
*B01J 19/08* (2006.01)
(52) U.S. Cl. .................................. 422/186.26
(58) Field of Classification Search ............. 422/186.26
See application file for complete search history.

(56) References Cited
U.S. PATENT DOCUMENTS 5,482,601 A * 1/1996 Ohshima et al. ............ 204/173
6,540,966 B1 * 4/2003 Santilli ................... 422/186.21
6,673,322 B2 * 1/2004 Santilli ................... 422/186.21
7,105,079 B2 * 9/2006 Waldeck et al. ............. 204/164

* cited by examiner

Primary Examiner—Kishor Mayekar
(74) Attorney, Agent, or Firm—Larson & Larson, P.A.; Frank Liebenow

(57) ABSTRACT

An apparatus for making a combustible gas that comprises a vessel filled with a liquid, a submerged electric arc between a moving anode acting on a cathode moving in a direction perpendicular to the anode. An incandescence of an interface area between the electrodes is enclosed on all sides by insulating skirts, except for clearances suitable for the flow of the liquid through the electric arc and the exit of the liquid. The gas produced by the submerged electric arc acting on the liquid, bubbles to the surface of the liquid for collection at a desired pressure, physical and chemical esoenergetic reactions caused by the electric arc generate heat acquired by the liquid, which can be used to in an external heat exchanger to generate steam or electricity, and solid residues accumulate in strainers placed along a liquid flow for periodic collection.

16 Claims, 14 Drawing Sheets

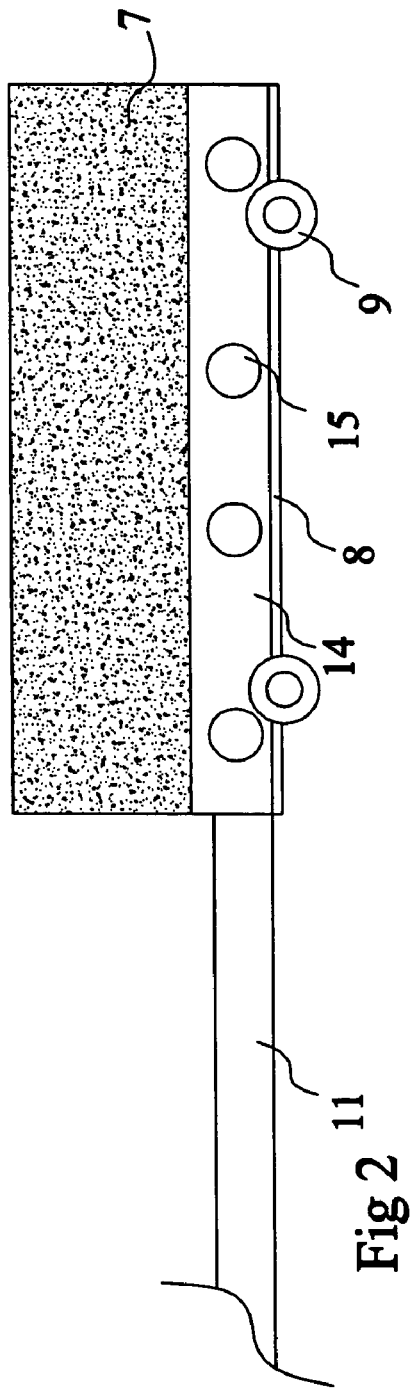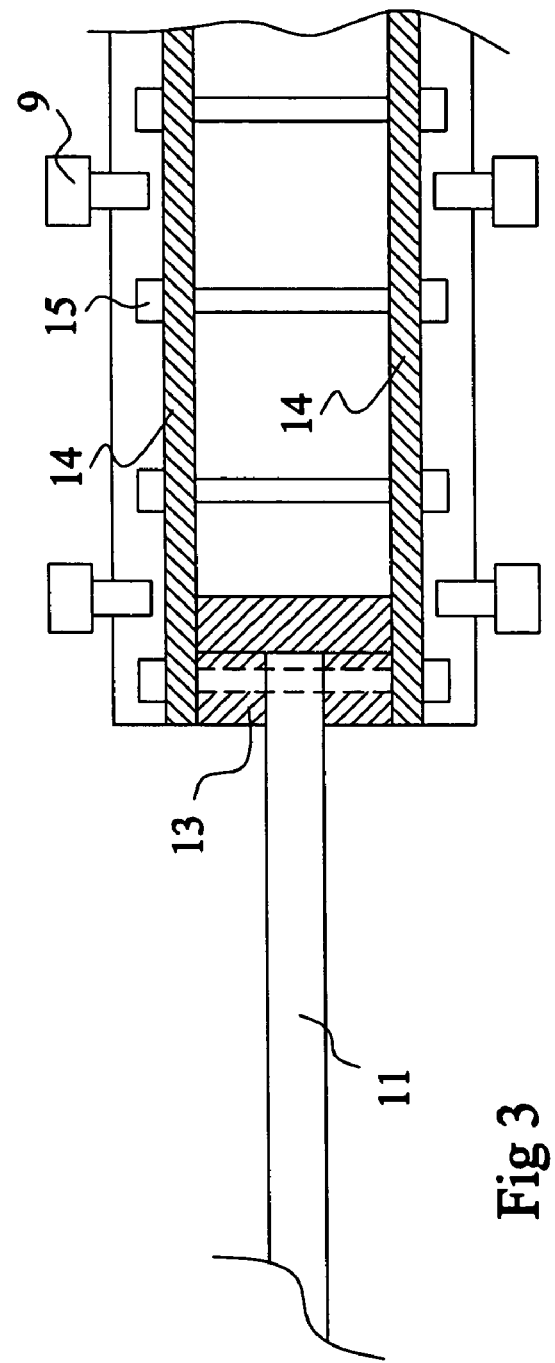

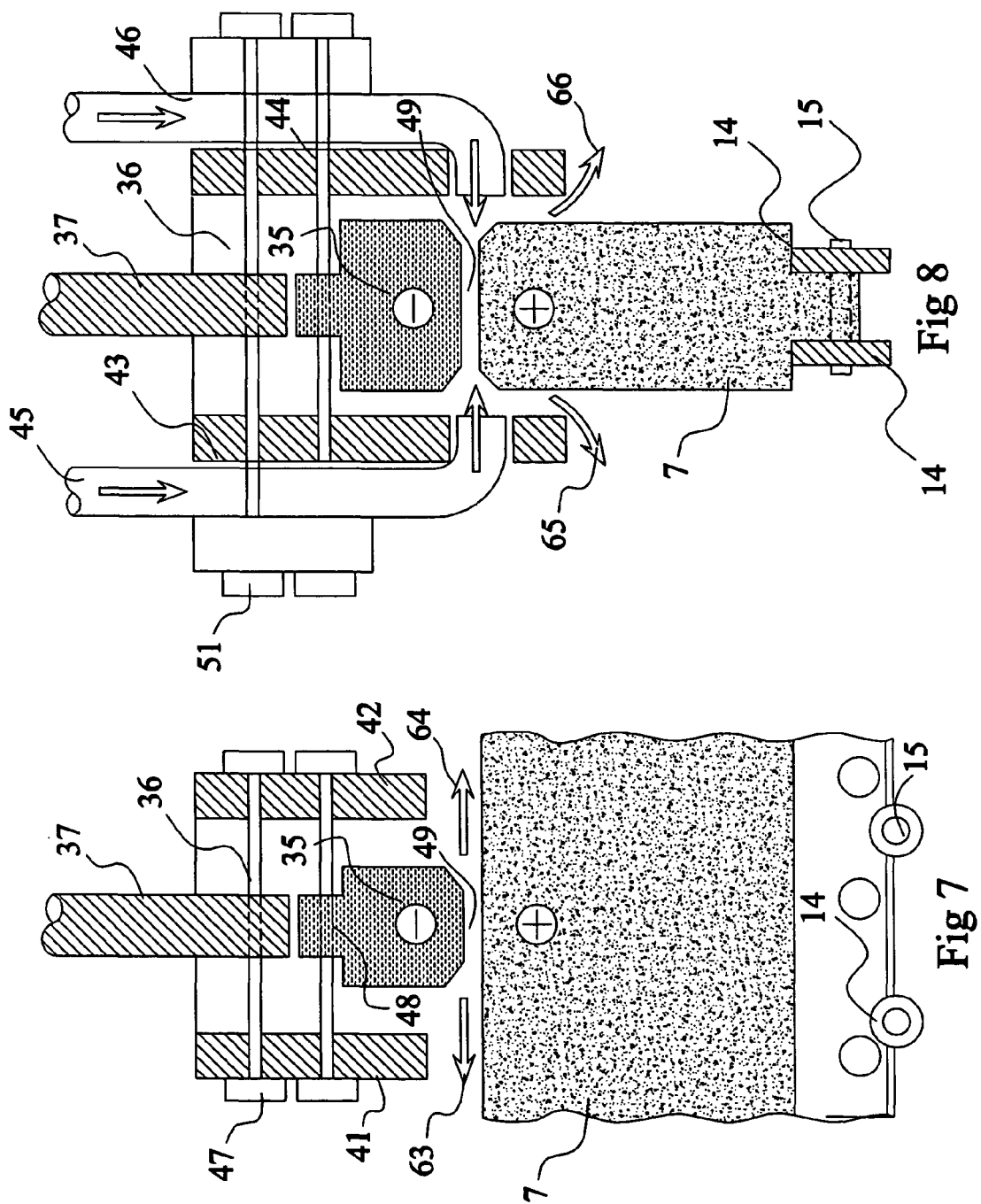

PLASMA-ARC-FLOW APPARATUS FOR SUBMERGED LONG LASTING ELECTRIC ARCS OPERATING UNDER HIGH POWER, PRESSURE AND TEMPERATURE CONDITIONS TO PRODUCE A COMBUSTIBLE GAS

FIELD OF THE INVENTION

The invention deals with the production of a clean burning, cost competitive combustible fuel produced via submerged electric arcs between carbon electrodes.

BACKGROUND OF THE INVENTION

Examples of prior art in the field is given by U.S. Pat. Nos. 6,030,58 to H. Eldridge; 5,159,900 to W. A. Dammann and D. Wallman; 5,435,274 to W. H. Richardson, Jr.; 5,417,817 to W. A. Dammann and D. Wallman; 5,692,459 to W. H. Richardson, Jr.; 5, 792,325 to W. H. Richardson, Jr., and others, including U.S. Pat. Nos. 6,926,872, 6,673,322, 6,663,752, 6,540,966, and 6,183,604, all issued to the inventor herein.

Submerged electric arcs were discovered over 150 years ago by sailors soon after the first constructions of metal ships. The combustible character of the gas produced by submerged electric arcs was discovered at the same time by sailors assisting the submerged operators, the ignored bubbles of gas reaching the water surface being referred by reports of the time as "fire on water." Consequently, both submerged electric arcs and the combustible nature of the gas they produce cannot be patented and are of public domain.

About one century ago attempts were initiated for the industrial production of the combustible gas produced by submerged electric arcs. Despite numerous efforts, no industrial and/or consumer utility emerged because the production of the combustible gas resulted to be very inefficient, thus excessively expensive, besides suffering from serious environmental problems.

The efficiency in the art herein considered is generally given by the numerical value of the volume or calorific heat of the gas produced divided by the electric energy used for its production. The efficiency of conventional submerged electric arc is very low for several reasons. To begin, the electric arc is indeed very efficient for the separation of water molecules into hydrogen and oxygen atoms. However, the latter recombine with an implosion into water because the hydrogen and oxygen atom are contained in a plasma traversed by the electric arc that ignites the combustion of hydrogen in an oxygen rich environment. In fact, the primary origin of the majestic glow of submerged electric arcs is not given by the arc itself, but rather by the recombination of hydrogen and oxygen into water. Additional reasons for the inefficiency of conventional; submerged electric arcs are given by the loss of power caused by the electric resistance of carbon electrodes, particularly when in the dimension needed for minimal operation prior to replacement.

In more recent decades the industrial production of a combustible gas via submerged electric arcs was considered again, but an additional problem emerged, this time of environmental nature. As it is well known, one of the biggest environmental problems afflicting our planet is the "global warming" caused by a disproportionate increase of carbon dioxide, CO2 in our atmosphere, estimated to be of the order of one million tons of CO2 per day as a result of the daily operation of an estimated number of about one billion cars, one million trucks, one hundred thousand planes, plus an unknown number of agricultural, industrial and military vehicles.

The serious environmental problem here considered is that the arc first creates around the tips of the electrodes a plasma composed by mostly ionized atoms of hydrogen, oxygen and carbon. The great affinity of carbon and oxygen, that is at the origin of life, then creates carbon monoxide CO with the release of heat, while the residual hydrogen recombines into the hydrogen molecule H2 with the release of additional heat.

However, CO is combustible and, when in an oxygen rich plasma traversed by the electric arc, CO is turned into CO2 thus providing a third source of heat. Consequently, the combustible gas produced by underwater electric arcs between carbon electrodes is generally composed by H2, CO, CO2, H2O and other gases. The alarming environmental problem here considered is that up to 25% of CO2 has been measured in the exhaust of said combustible gas, compared to about 5%-7% CO2 emission for gasoline operated cars. Consequently, a widespread automotive and other uses of said combustible gas could be potentially lethal for mankind due to cataclysmic climactic events that would follow the release of a large production of CO2 in the combustion exhaust.

All the above problems were resolved by U.S. Pat. No. 6,450,966 to this inventor via the PlasmaArcFlow™ process, consisting in the continuous flowing of the liquid feedstock though the electric arc. In fact, such a flow prevents most of the separated hydrogen and oxygen to recombine into water, thus permitting a dramatic increase of the efficiency that has been measured to be about ten times that of stationary electric arcs by therefore achieving for the first time industrial and consumer utility. Additionally, the PlasmaArcFlow also removes the various combinations of carbon and oxygen in single, double and triple valence bonds immediately following their creation, to such an extent that the possible measurement of macroscopic percentages of CO2 in the gaseous fuel prior to combustion is currently used as means to detect an insufficient PlasmaArcFlow.

The combustible gas produced by the PlasmaArcFlow process for submerged electric arcs is currently produced and sold under the tradename of MagneGas™ gas. Such a gas is clean because it generally contains no hydrocarbons due to the extreme temperature at which the gas is produced. Also, CO is part of the combustible gas itself, rather than a byproduct of the combustion as it is the case for fossil fuels. Additionally single bond C—O and double bond C=O contained in MagneGas gas are unstable and decompose under the combustion temperature releasing breathable oxygen in the exhaust. In fact, numerous measurements that can be easily repeated any time on request establish that the combustion exhaust MagneGas gas has no appreciable hydrocarbons or toxic substances such as carbon monoxide CO or nitrogen oxides NOx, while being essentially constituted by 50%-55% water vapor, 12%-14% oxygen, 5%-7% carbon dioxide the rest being given by atmospheric gases. Therefore, the combustible gas addressed in this invention do have a large ecological and, therefore, industrial and consumer utility.

Following the resolution of the basic problems of submerged stationary electric arcs via the new PlasmaArcFlow process, an additional laborious efforts were initiated by the inventor to achieve sufficient operating life prior to the replacement of the consumable carbon electrodes, as well so as to achieve the competitive cost of the gaseous fuel produced that is necessary for industrial and consumer utility.

U.S. Pat. No. 6,926,872 to this inventor addresses the issue of operating life by proposing a number of configurations for durable carbon-base electrodes. A main problem in the production of clean burning gases from underliquid electric arcs is that it is not possible to use tungsten electrodes, since they would melt almost instantly under 50 Kw or bigger power even when having 2" OD. This occurrence leaves the use of carbon-base electrodes the sole electrodes capable of withstanding the very high temperature of the submerged electric arc that reach the 10,000 degrees F. for 100 Kw power.

However, carbon-base electrodes are rapidly consumed, not only in view of the delivery of big electric currents, but also because said consumption is necessary to provide the carbon needed for the stability of the gaseous fuel. For instance, a DC electric arc between 1" diameter carbon-base rod electrodes within water or water soluble liquid feedstock powered by a 50 Kw DC generator generally consumes the positively charged cathode at the rate of about 1 linear inch per minute, corresponding to the consumption of about 0.76 cubic inches (ci) of carbon per minute or about 47 ci of carbon per hour. By noting that 50 Kwh generally produce 500 cubic feet (cf) of combustible gas per hour, the consumption of carbon per cubic foot of the produced gas is of the order of 0.1 ci/cf. The above consumption is dramatically reduced for the processing of carbon rich liquid feedstock, such as oils or oil wastes. In all cases, the consumption of the negatively charged anode is generally minimal and not superior to $\frac{1}{10}$-th the consumption of the anode.

The problem of a durable configuration of the carbon electrodes has been addressed by U.S. Pat. No. 6,926,872 as well as by numerous other patents, such as U.S. Pat. Nos. 603,058 to H. Eldridge; 5,159,900 to W. A. Dammann and D. Wallman; 5,435,274 to W. H. Richardson, Jr.; 5,417,817 to W. A. Dammann and D. Wallman; 5,692,459 to W. H. Richardson, Jr.; 5, 792,325 to W. H. Richardson, Jr. Nevertheless, all these configurations are afflicted by one or another of the following insufficiencies:

1) Inability of delivering to the electrodes large powers of the order of 500 Kw or more. This limitation is inherent in all configurations of U.S. Pat. No. 6,926,872 and the other prior art patents where the copper rods delivering power to the electrode rotate for the scope of achieving a longer life. In fact, the rotation forces the delivering of power via sliding contacts that, as such, have notorious limitation in power delivery due to microarcs, abrasion, and other problems.

2) Inability to effectively enclose the incandescent area surrounding the electric arc. This inability is also evident in all configurations of U.S. Pat. No. 6,926,872 and the other prior art due, for instance, to structural differences between the anode and cathode, This limitation carries severe shortcomings in the utility of the invention. For instance, as clearly shown in U.S. Pat. No. 6,450,966, it is impossible to recycle city, farm or ship sewage with an electric arc unless the incandescent area is enclosed by suitable skirt because, in the absence of the latter, there is always a portion of the sewage that is not exposed to the plasma of the electric arc with resulting inability to sterilize the liquid and resulting inability to use the invention for an important societal need.

3) Inability to reach high pressure and temperature. This inability is also evident in all preceding configurations because the copper rod delivering the power to the electrodes have to pass through seals in order to penetrate inside the apparatus. In turn, such a configuration is inoperative at large pressure because the force caused by pressure on the copper rods is so strong to prevent the instantaneous micrometric motions necessary for the control of the electric arc. The same configurations also do not permit large temperature, such as those over 500 degrees F., due to the consequential failure of the seals. These limitations are rather serious because the efficiency of the apparatus as defined above increases dramatically with the increase of the operating pressure since the size of the bubbles of the gas surrounding the arc is reduced with pressure thus increasing the travel of the arc through the liquid feedstock. The efficiency of the apparatus also increases with the increase of the operating temperature because the arc first evaporates the liquid feedstock, then separates the liquid molecules and then forms a plasma with their ionized atomic constituents. Consequently, operations at sufficiently high temperature eliminate the use of electric energy for evaporation with a consequential increase of the efficiency and reduction of costs.

This invention achieves for the first time an apparatus permitting: 1) the desired long electrode life of the order of weeks of continuous use or more prior to electrode replacement, 2) effective enclosure of the incandescent area of the electrodes to permit recycling of city, farm or ship sewage with its full sterilization; 3) delivery of unlimited electric power to the electrodes; 4) minimization of the power loss due to the electric resistance of the electrodes; 5) production of the combustible gas at any desired pressure in order to eliminate the use for expensive compressions of the produced gas, for instance, to directly fill up an automotive tank; 6) achievement of high operating temperatures of the order of 1,500 degrees F. or more so as to permit the utilization of the heat produced by the apparatus for the production of steam via a heat exchanger that, in turn, can be used for the production of "green electricity," namely, electricity meeting the environmental specifications according to the Kyoto Accord; and 7) Automation in the extraction of the electrodes for easiness of service as well as complete automation of the operations as well as their optimization.

BRIEF DESCRIPTION OF THE DRAWINGS

FIG. 2 depicts the housing of the cathode on copper holders;

FIG. 3 depicts the top view of the cathode assembly;

FIG. 7 depicts the vertical middle section of the anode and cathode along the direction of the cathode;

FIG. 8 depicts the middle sectional view of the anode and cathode perpendicular to that of FIG. 7 showing the PlasmaArcFlow process;

DETAILED DESCRIPTION OF THE INVENTION

Figure 1:
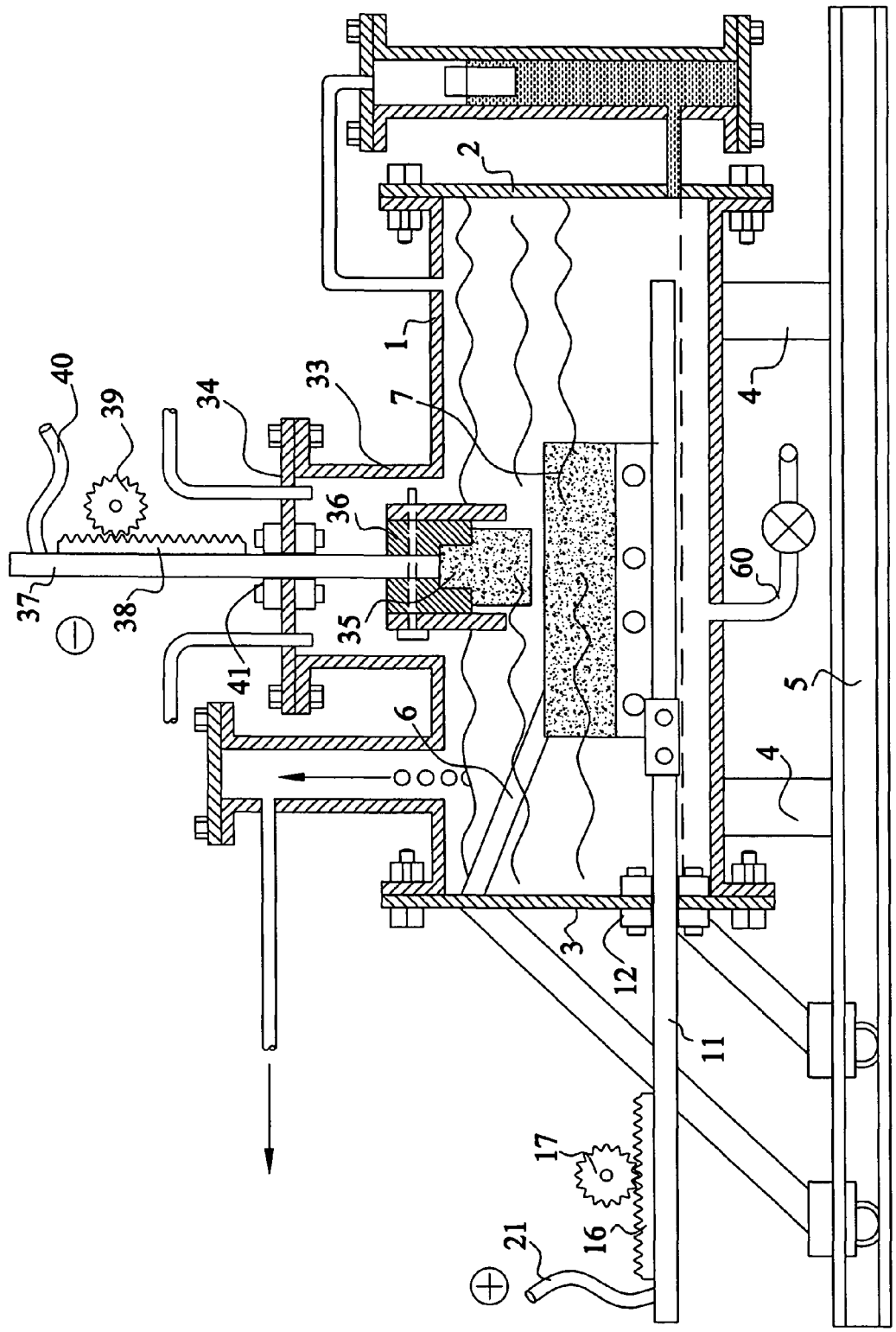
FIG. 1A depicts a partial cross-sectional conceptual view of a preferred embodiment.

The invention is a pressure and temperature resistant metal vessel filled with a liquid comprising in its interior at least one submerged electric arc between a moving negatively charged, carbon base anode acting on a positively charged, carbon base cathode moving in a direction perpendicular to the moving direction of said anode, wherein the vessel is equipped with means to deliver a DC electric current to said electrodes during their respective motions, and said means including copper holders minimizing the distance between the delivery of the current and the electric arc. Long operating life is achieved via the non-consuming anode acting on the cathode with the desired length while minimizing the loss of power due to the electric resistance of carbon electrodes.

The incandescence of the interface area between the anode and cathode is enclosed on all sides by temperature resistant electrically insulating skirts, except for clearances suitable for the flow of said liquid through the electric arc while the exit of same liquid through said enclosure. The combustible gas produced by the submerged electric arc bubbles to the surface of the liquid for collection at the desired pressure.

The physical and chemical esoenergetic reactions caused by the electric arc generate heat acquired by said liquid and used via a heat exchanger, and solid residues accumulate in strainers placed along the liquid flow and are periodically collected.

The invention further comprises electronic controls for the initiation, maintenance and optimization of the electric arc via the motion of the anode toward or away from the perpendicularly moving cathode, and electronic means for the automatic motion of the cathode under the anode at a minimal speed sufficient to maintain incandescence.

All means for delivering the negative polarity of the electric current, the motion of said anode and related support are fastened to a flange for easiness of removal, inspection and service. All means for delivering the positive polarity of the electric current, the motion and related support of said cathode are fastened to a flange for easiness of removal, inspection and service.

Railings for the removal of the flange incorporating the cathode and the anode are also incorporated in the invention. In addition, hydraulic means for the rapid and automatic removal of internal cathode and anodes are included.

The negative and positive polarities of the electric current are delivered through copper rods passing through seals housed in the respective flanges.

The means for causing the motions of the anode and cathode are internal so as to allow high operating pressures and temperature.

Means for flowing the liquid through the electric arc while compensating automatically for the variation of the location of the arc due to electrode consumption are also included in the invention, as well as means for monitoring the level of said liquid, means for the automatic refill of the liquid following its consumption, and means for the removal of liquid residues from the gas produced and the return of the liquid residues to the vessel. The flow of the liquid through an external heat exchanger allows for the production of steam, which in turn can be used to produce electricity.

The following drawing depictions are examples of the typical component arrangement of systems that comprise the invention.

FIG. 1 depicts one of the preferred embodiments of this invention. The main operating principle is that of flowing the liquid feedstock through the arc between a vertically moving, rectangularly shaped, negatively charged anode and a horizontally moving, rectangularly shaped, positively charged cathode, the rectangular area of the anode facing the cathode where the arc occurs being enclosed with phenolic skirts more appropriately described below so that the liquid feedstock is forced to flow through the plasma created by the arc, but not more than said area. In this way, the anode can have a moderate length due to its lack of consumption, thus minimizing the dissipation of electric power due to carbon resistance; the consumable cathode has any desired life achieved via any desired horizontal length, while the dissipation of electric energy is controlled by the limited length of the cathode in the direction of the anode. The resulting new PlasmaArcFlow process is then useful for long term continuous treatment of biocontaminated liquids or any other liquid thanks to the restriction of its flow through the plasma caused by the electric arc.

This preferred apparatus can operate with 100 Kw DC power delivered to 2" OD copper rods that, in turn, are fastened to said electrodes. However, the same apparatus can deliver DC power up to one megawatt via the corresponding increase of the diameter of the copper rods. Also, the embodiment herein considered refers to a vertically moving anode and a horizontally moving cathode with the understanding that the apparatus equally works for any orientation with the sole restriction that the motions of the anode and cathode are perpendicular to each other. Also, particularly effective to enhance efficiency and heat production is a pulsating DC current with a frequency that is a submultiple of the resonating frequency of the processed liquid molecule.

Figure 4:
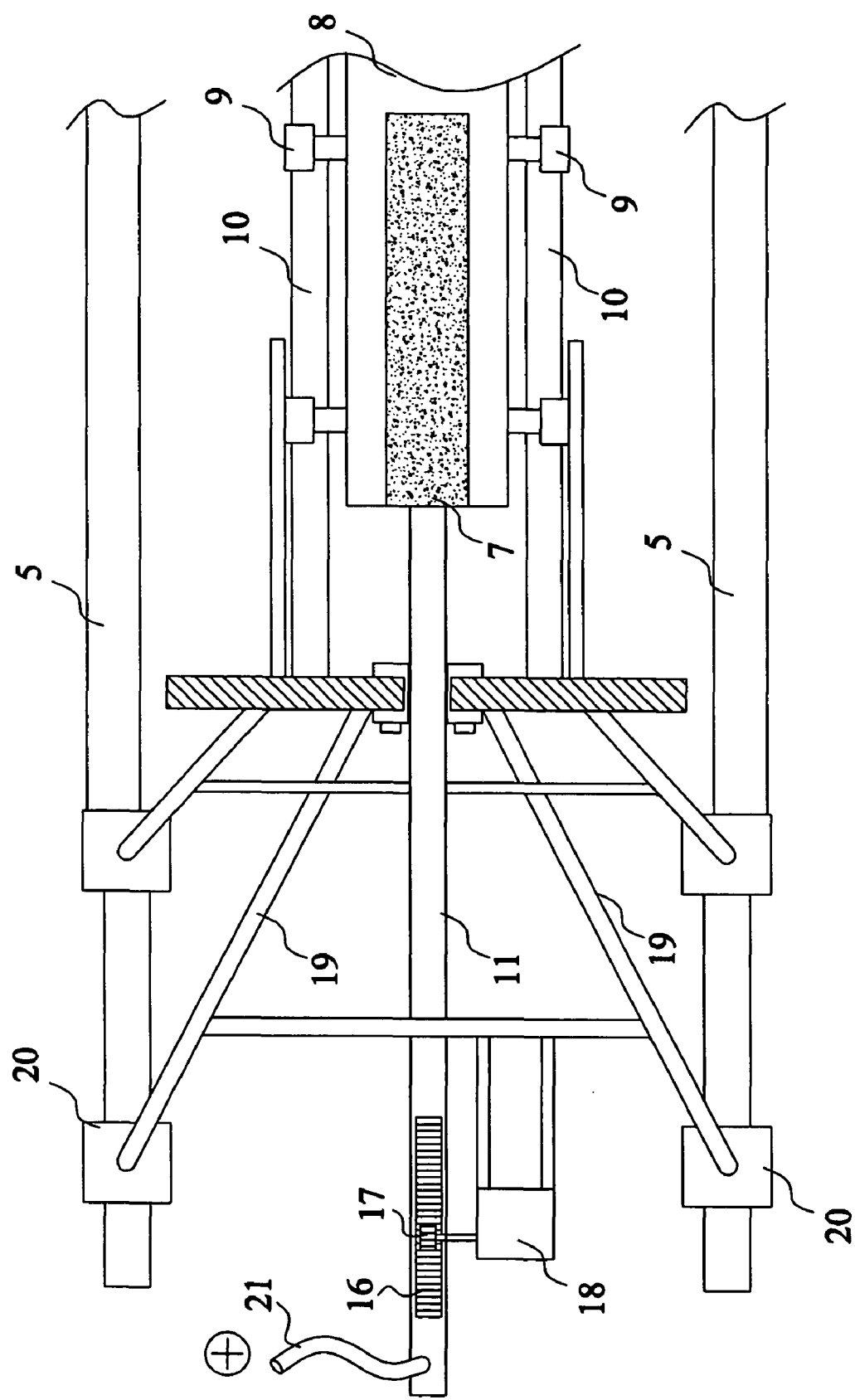
FIG. 4 depicts a top view of the flange housing the cathode assembly.

This embodiment comprises a horizontal 24" OD and 5' long schedule 40 carbon steel pipe 1 enclosed on both sides by 150 pounds ANSI flanges 2, 3 and solidly connected via bases 4, 5 to a 3" U channel 5. Frame 6 welded to flange 3 houses the positively charged cathode 7 consisting of a high density and hardness carbon slab of 5" in thickness, 10" in height and 24" in length placed with the 10" dimension vertical over a 7"×27"×1" steel plate 8 depicted in FIGS. 2, 3 and 4, which plate houses four wheels 9 suitable to move within two horizontal 2" U channels that are an integral part of frame 6 welded to flange 3 as shown in FIG. 4. By no means the shape of the electrodes should be restricted to the rectangular shape of the figures, since the embodiment herein consider equally works with great industrial and consumer utility with rod shaped electrodes in the same vertical and horizontal configuration of the embodiment herein described.

The positive polarity of a DC electric current is delivered to cathode 7 via copper shaft 11 that enters into vessel 1 through flange 3 via sealed bushing 12 more appropriately described below and connects to copper block 13 delivering the positive polarity to two copper bands 14 having the dimension of 1" thick 1.5" high and 24" long that are tightly fastened to cathode 7 via through bolts 15 as shown in FIGS. 2 and 3.

When flange 3 is solidly bolted to vessel 1, cathode 7 is made to slide horizontally from the extreme left to the extreme right of pipe 1 except 6" clearance on both sides via rake 16 acted upon by pinion 17 that is powered by electric motor 18 solidly connected to the outside frame 19 welded to the outside of flange 3 according to a very low speed requiring one hour for the entire passage from one side to the other of vessel 1.

Figure 5:
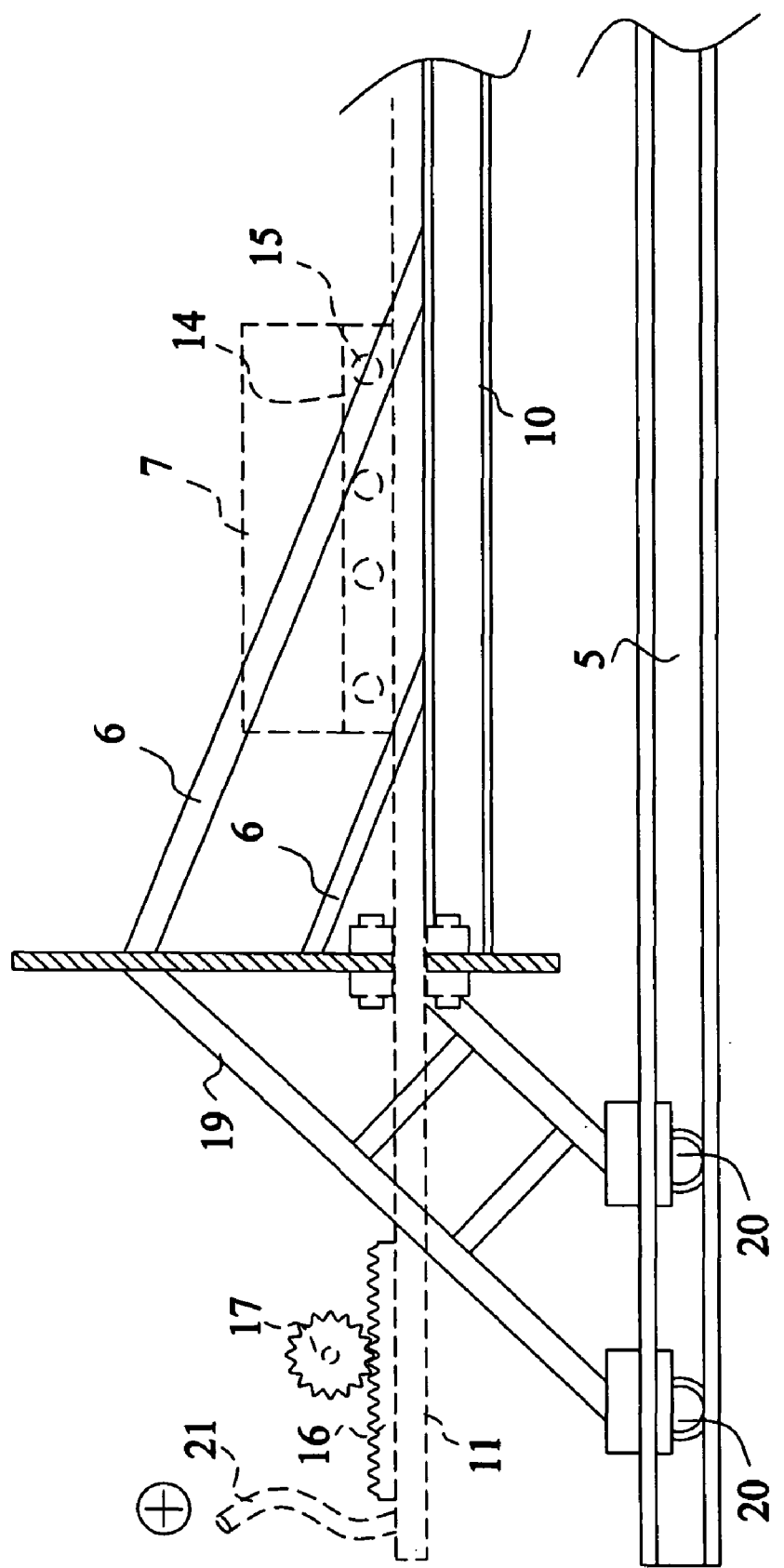
FIG. 5 depicts the side view of the flange housing the cathode assembly when completely extracted from the apparatus.

When the cathode needs to be replaced, flange 3 is unbolted from vessel 1 and the entire cathode assembly can slide out of vessel 1 as shown in FIG. 5 thanks to the completion of outside frame 19 with four wheels 20 that are such to operate within the 3"U channels 5. The replacement of the cathode is then done by loosening bolts 15 opening copper bands 14, placing the new cathode 7 and reassembling the cathode copper bands as set before disassembly. The entire operation takes about 20 minutes. The length of the U channel 5 is evidently that of the vessel 1 plus the entire exit of the cathode assembly from said vessel resulting in a total of about 12' in length. The positive polarity of the DC current is delivered to the cathode via heavy gauge wire 21 bolted to the end of copper rod 11.

Figure 6:
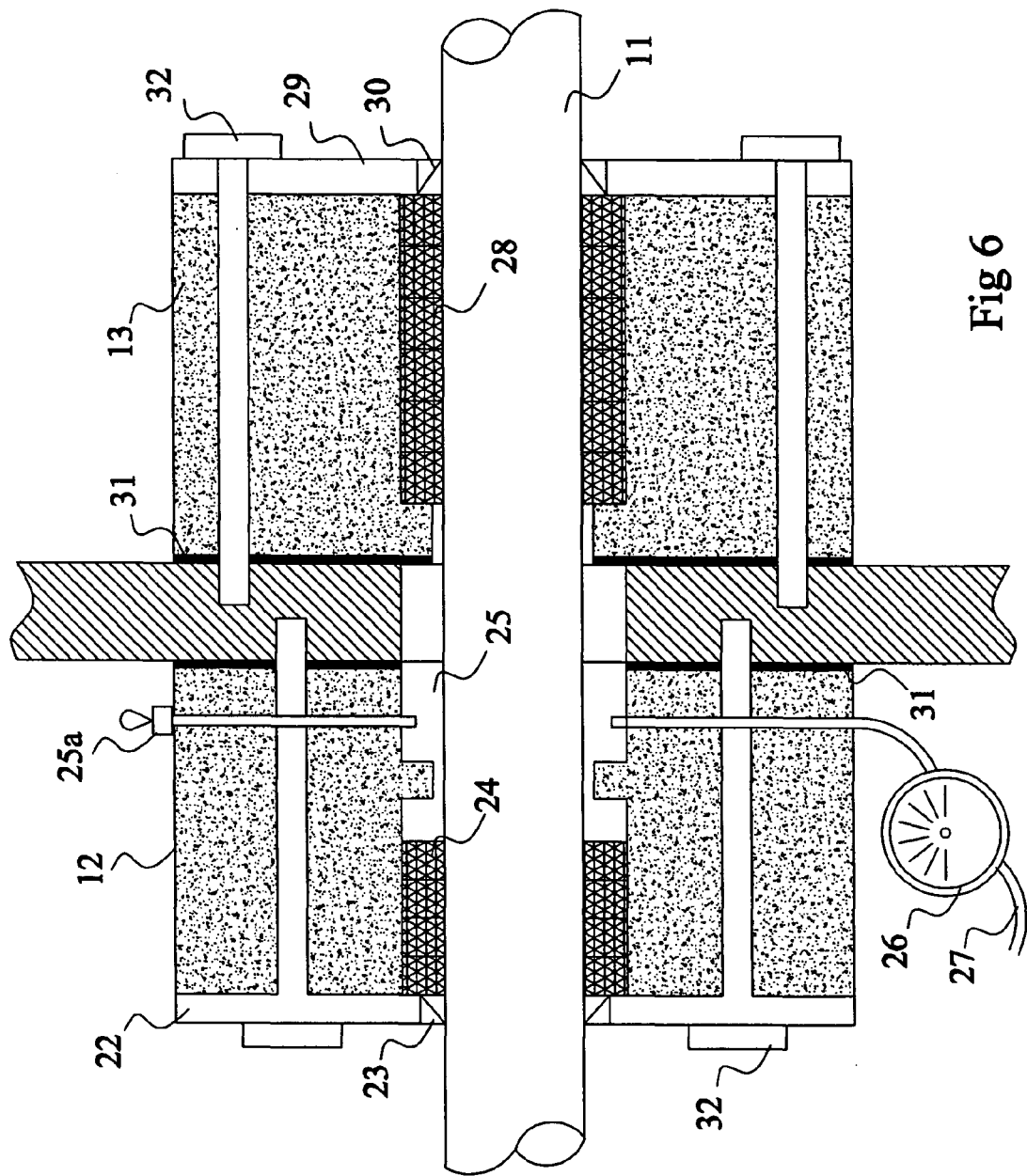
FIG. 6 depicts the internal and external bushing with seals.

External bushing 12 permitting the complete sealing of copper shaft 11 when sliding through flange 3 is more particularly depicted in FIG. 6 and consists of a 6" OD and 6" long G10 phenolic rod and comprises a front disc 22 incorporating scraper 23 with seven internal seals 24 and an empty chamber 25 connected to external nipple 25a used to add grease to the sliding functions, chamber 25 being additionally connected to pressure gauge 26 that is, in turn, connected to the automatic controls of the apparatus via wires 27. In the event any pressure is measured in chamber 25 by pressure gauge 26, this denotes the failures of the internal seals 28. The automatic controls then halt any and all operations for safety while external seals 24 are still fully operational, by preventing in this way any leak of internal substances in case of internal seal failure. External bushing 12 is completed with internal bushing 13 having the same dimension and composition of external bushing 12 and comprising shield 29, internal scrapers 30 and internal seals 28. Bushings 12 and 13 are completed by external and internal gaskets 31 and bolts 32 fastening bushings 12 and 13 to flange 3.

Horizontal vessel 1 of FIG. 1 is completed by vertical 18" OD and 24" high schedule 40 carbon steel pipe 33 closed by top flange 34 which vertical pipe houses in its interior the negatively charged anode 35 consisting of high density and high hardness carbon with the dimension of 5" wide, 7" high and 7" long and 5¼" thick block housed in such a way to have the 7" length along the direction of the horizontal cathode in such a way to have approximately ⅛" over hang on each side of the 5" thick cathode.

The negative polarity 40 of the DC current is delivered to anode 35 via 2" OD copper rod 37 and copper joint 36 fastening copper rod 38 to anode 35 via fast disassembling means, such as nuts and bolts, to allow rapid replacement of the anode when needed. The vertical motion of anode 35 toward and away cathode 7 more needed to establish and maintain an arc is achieved via rake 38 fastened to copper rod 37 and vertically moved by pinion 39 connected with a servomotor that, in turn, is operated by the automatic controls described below. The length of rake 38 is that of the vertical consumption of the cathode, 9" out of 10" available, plus the consumable 6" length of the anode out of the total height of 7", plus 1" for gap clearance for arc off position resulting in a total length suitable to allow 16".of vertical upward or downward travel. Rod 37 penetrates through flange 34 via phenolic bushing 41 that is identical to bushing 12 of the cathode depicted in details in FIG. 6.

Figure 9:
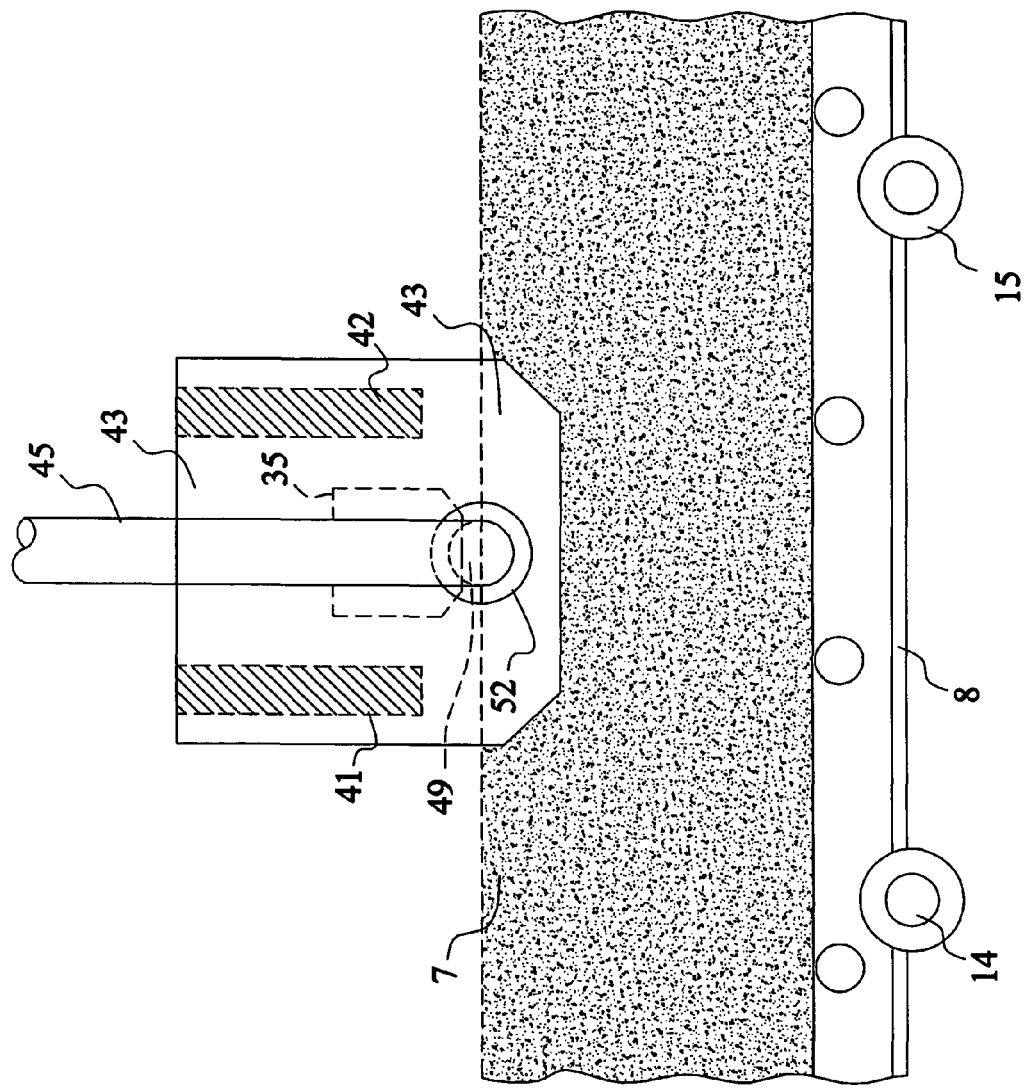
FIG. 9 shows the external side view of the anode and cathode assembly with enclosing skirts.

FIGS. 7, 8 and 9 describe the PlasmaArcFlow process and apparatus of this invention, namely, the means for forcing the liquid feedstock through the electric arc. FIG. 7 is a sectional view along the middle vertical plane of the main vessel 1 of FIG. 1 showing the 5"×10"×24" carbon cathode 7 with related two 1"×2"×24" copper bars 14 delivering the positive polarity to cathode 7, one per each side of cathode 7, plus through bolts 15 fastening said copper bars 14 to cathode 7, the 5.250"×7"×7" carbon anode 35 plus a cylindrical 3" OD×2" high extension 48, the 2" OD copper rod 37 delivering the negative polarity of the DC current to the anode 35, the 6"×6"×6" copper holder 36 fastening anode 35 to the copper rod 37, the two vertical, phenolic G10 or equivalent 1"×6"×5" skirt 41 and 42 one per each side of the anode 35 with the function of restricting the flow of the liquid feedstock as well as to protect the copper holder 36 against the full consumption of the anode 35 with the electric arc still active, thus causing the meltdown of said holder 36, the entire assembly being fastened by through bolts 47 and related nuts.

FIG. 8 depicts the sectional view along a vertical middle plane perpendicular to that of FIG. 7 along the center of the anode tower 33 of FIG. 1, including: cathode 7 with related two copper bars 14 and fastening through bolts 15; the anode 35, its copper holder 36 and copper rod 37; plus two 1" OD carbon steel vertical pipes 45, 46 terminating with a 90 degrees bend as shown with outflow centerline placed in the center of the electrode gap 49, said pipes 45, 46 having the function of delivering the flow of the liquid feedstock through said gap 49 via connection to recirculating pumps, not shown in the figure because trivial to the skilled in the art, that take the liquid feedstock from the discharge 60 at the bottom of the main vessel 1 of FIG. 1 and downward forces said liquid feedstock through pipes 45, 46 and then through gap 49; plus two 1"×15"×9" vertical phenolic G10 or equivalent skirts 43, 44 having the function of enclosing the area of incandescence caused by the electric arc, plus that of protecting copper bars 14 against the consumption of the cathode, resulting in the destruction of said copper bars 14 under the continued arc for a consumed cathode; the entire assembly being fastened together by through bolts 51 perpendicular to bolts 47 of FIG. 7.

FIG. 9 depicts the frontal view of FIG. 8 showing: the cathode 7 with copper bars 14 and related through bolts 15; vertical pipe 45 for the feedstock flow through the arc gap 49; phenolic skirt 43 with hole 52 for pipe 45 with a dashed view of the perpendicular vertical skirts 41, 42. In this way, the liquid feedstock is picked up from the bottom of the main vessel 1 through exit pipe 60, then pumped downward through pipes 45, 46, and then forced through the gap 49. Consequently, the liquid feedstock passes through the incandescent region caused by the electric arc and exists through controlled openings 63, 64, 65, 66. In the above embodiment the liquid is flown through the arc via pipes 45, 46 one per each side. However, it is evident that the same flow can be achieved via a number of pipes per each side.

Figure 10:
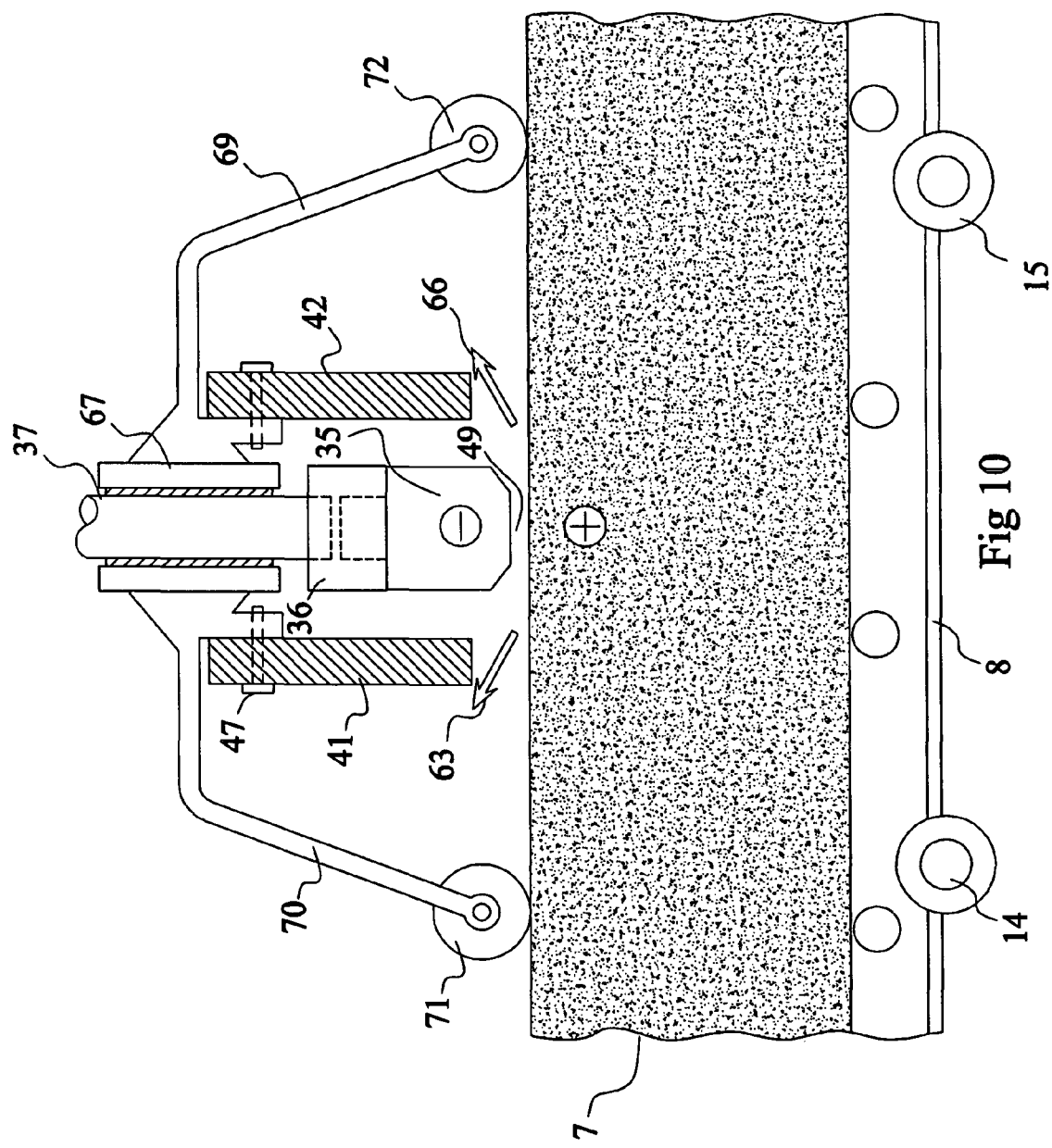
FIG. 10 shows a sectional view of the PlasmaArcFlow assembly self-adjusting with the change of electrode gap due to consumption.
Figure 11:
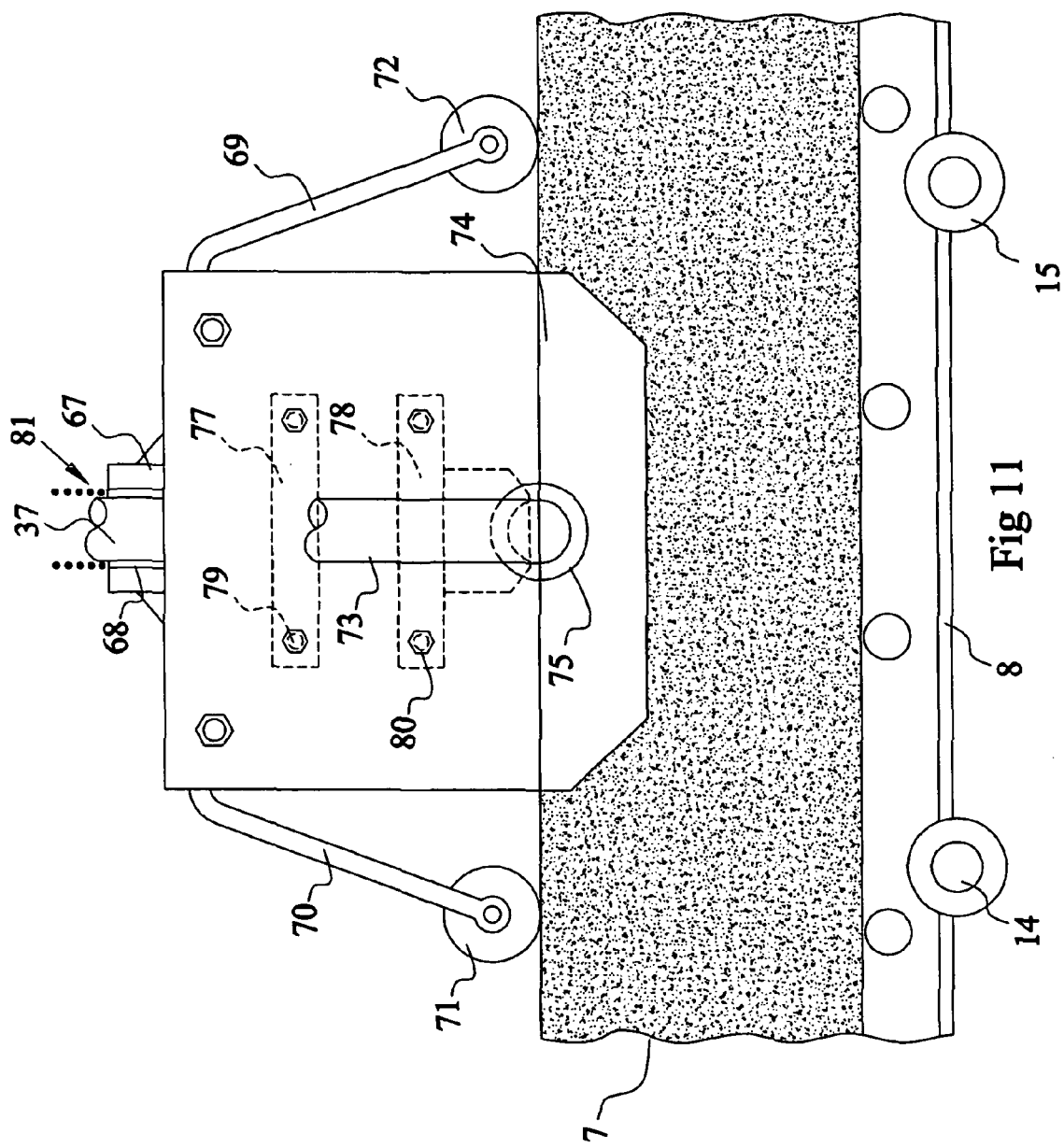
FIG. 11 shows an external view of that of FIG. 10.

FIGS. 10 and 11 depict an alternative embodiment assuring that the liquid feedstock is always forced through the electrode gap despite the consumption of the electrodes and consequential variation of the position of said arc. This alternative embodiment is realized via a 3" OD×5" high carbon steel bushing sliding vertically on copper rods 37 via bushing 68 in teflon or equivalent; said bushing 67 is welded to carbon steels arms 69, 70, each terminating with a freely rotating wheels 71,72 in phenolic G10 or equivalent having 3" OD and 2" thickness and being placed at 15"; vertical skirt 76, one per each side of the cathode, are now fastened to bushing 67 via bolts 76 on a suitable base not shown in the figure because trivial for the skilled in the art; the PlasmaArcFlow pipe 73 is now fastened to skirt 74 via bridges 77, 78 and through bolts 79, 80; the assembly being completed by spring 81 forcing bushing 67 downward. In this way, the liquid feedstock is always forced through gap 49 irrespective of its location thanks to the location of wheels 71, 72 on the top of the cathode. When the cathode 7 is at one end position in its horizontal motion under the anode 35, one of the two wheels 71,72 is no longer in contact with the top surface of the cathode 7, but the other wheel is on said top, thus assuring compatibility of the embodiment of FIGS. 10 and 11 with the main principle of this invention.

Figure 12:
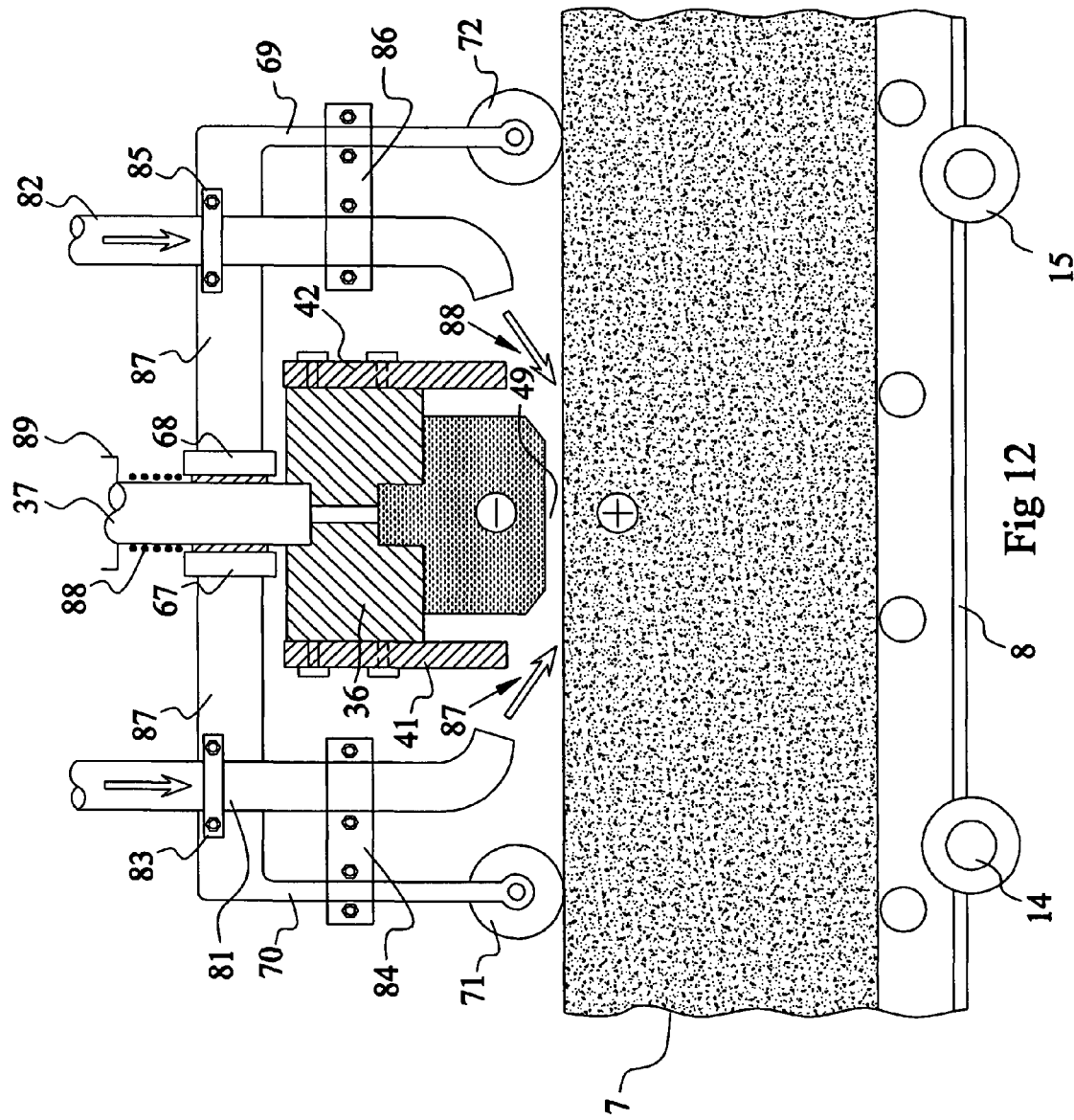
FIG. 12 shows yet another configuration of the PlasmaArcFlow process.

FIG. 12 depicts an alternative PlasmaArcFlow embodiment in which the liquid feedstock is forced through the gap according to a flow along the direction of the long side of the cathode, while in the embodiments of the preceding FIGS. 7 through 11, the liquid feedstock is forced through the gap of the electric arc in a direction perpendicular to the long side of the cathode. FIG. 12 comprises the following components essentially similar to the corresponding components of the preceding embodiment of FIGS. 7 though 11: the cathode 7 with related copper bar 14 and fastening means 15; the anode 35 with related copper holder 36 and copper rod 37. A 3" OD×3" height carbon steel bushing 67 is permitted to slide along copper rod 37 thanks to bushing 68 in teflon or equivalent, said carbon steel bushing terminating in this embodiment in steel frame 87 extending horizontally on each side of the anode and then vertically down to phenolic wheels 71, 72 acting on the surface of cathode 7 thanks to spring 89 in between the top of bushing 67 and the bottom 89 of phenolic bushing depicted in FIG. 6. In this alternative embodiment, the liquid feedstock is pumped downward through pipes 81, 82 fastened to frame 87 by brackets 83, 84, 85, 86 as shown; the liquid feedstock is then forced though gap 49 of the electric arc according to directions 87, 88 and exits in directions. The assembly can be completed with phenolic skirts 76 of FIG. 11 also fastened to frame 87, but this time without holes 75 for the PlasmaArcFlow pipes because this feature is un-necessary for this embodiment. The phenolic or ceramic wheels 71,72 in contact with the surface of the cathode operate within their limits because the entire assembly is submerged and the incandescence caused by the arc is restricted to the area immediately surrounding the interface between the anode and cathode, and the remaining area is cooled by the liquid feedstock.

The preceding embodiments of FIGS. 1 through 12 are fully operational with full industrial as well as consumer utility in the recycling of various liquid wastes into a clean burning, cost competitive, gaseous fuel. Nevertheless, the preceding embodiments have the following three significant limitations: 1) The embodiment ceases to operate at pressures of the order of 150 psi due to the excessive force caused by the internal pressure on the copper rods of the cathode and anode, thus pretending their proper operation due to delay times, resistance and other factors; 2) There is no possibility to operate the apparatus for temperatures over 450 degrees F. due to the limitations set by the seals of FIG. 6; and 3) the seals can fail and/or require service, thus having some inherent risk as well as requiring routine service.

Figure 13:
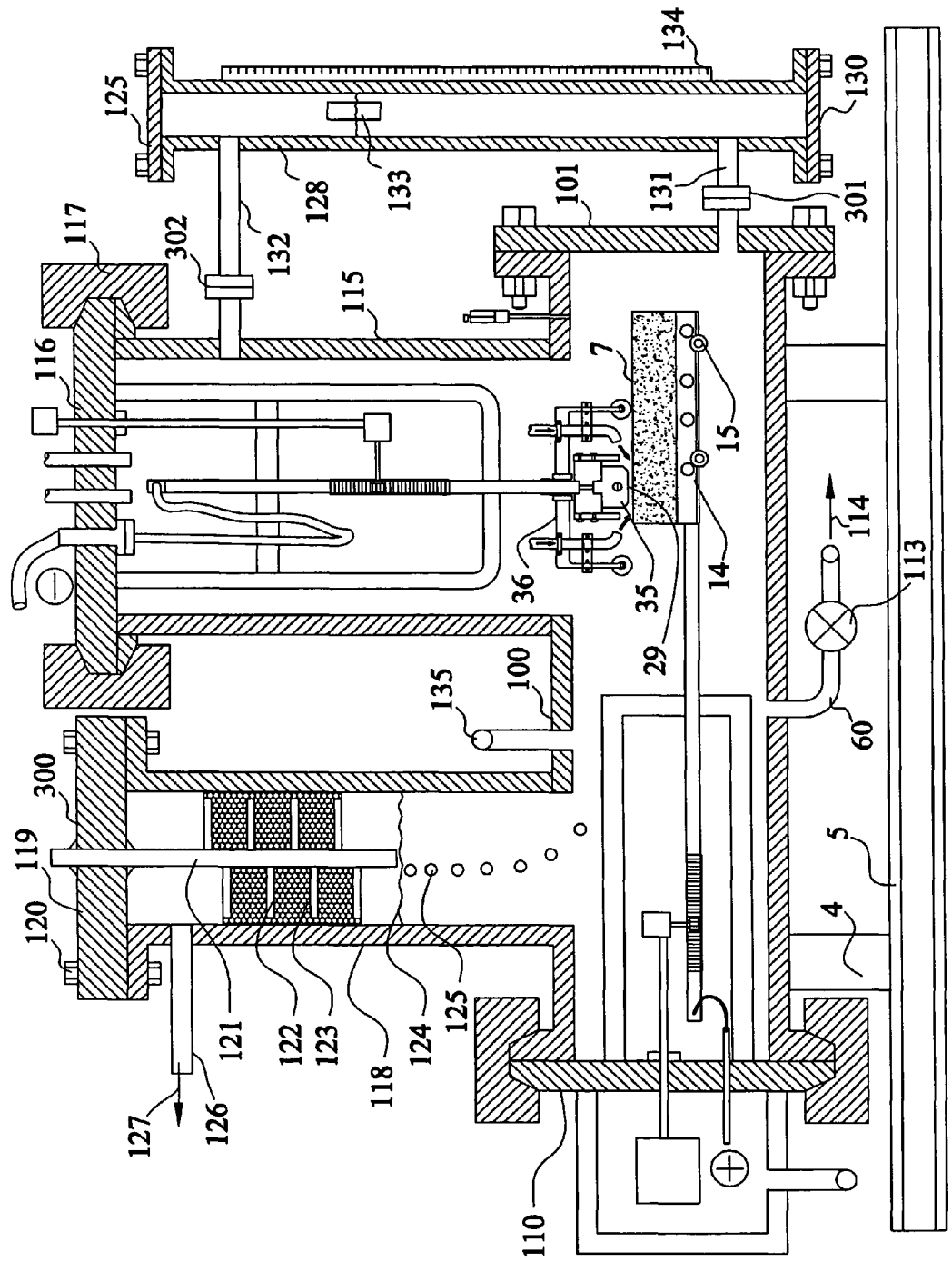
FIG. 13 shows another preferred embodiment with all internal parts to achieve high pressure and temperature.
Figure 14:
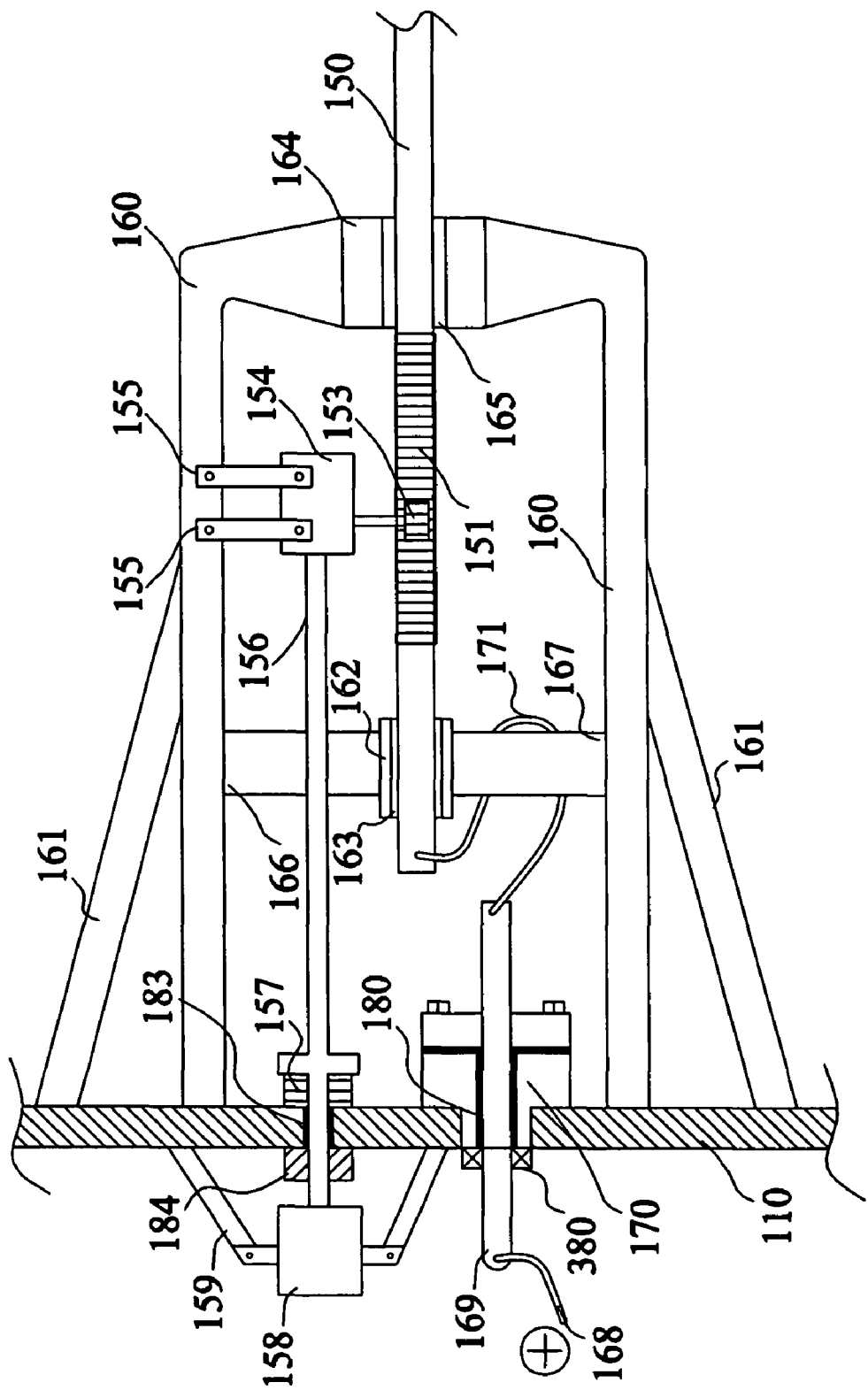
FIG. 14 shows a view of the cathode assembly for the embodiment of FIG. 13.
Figure 15:
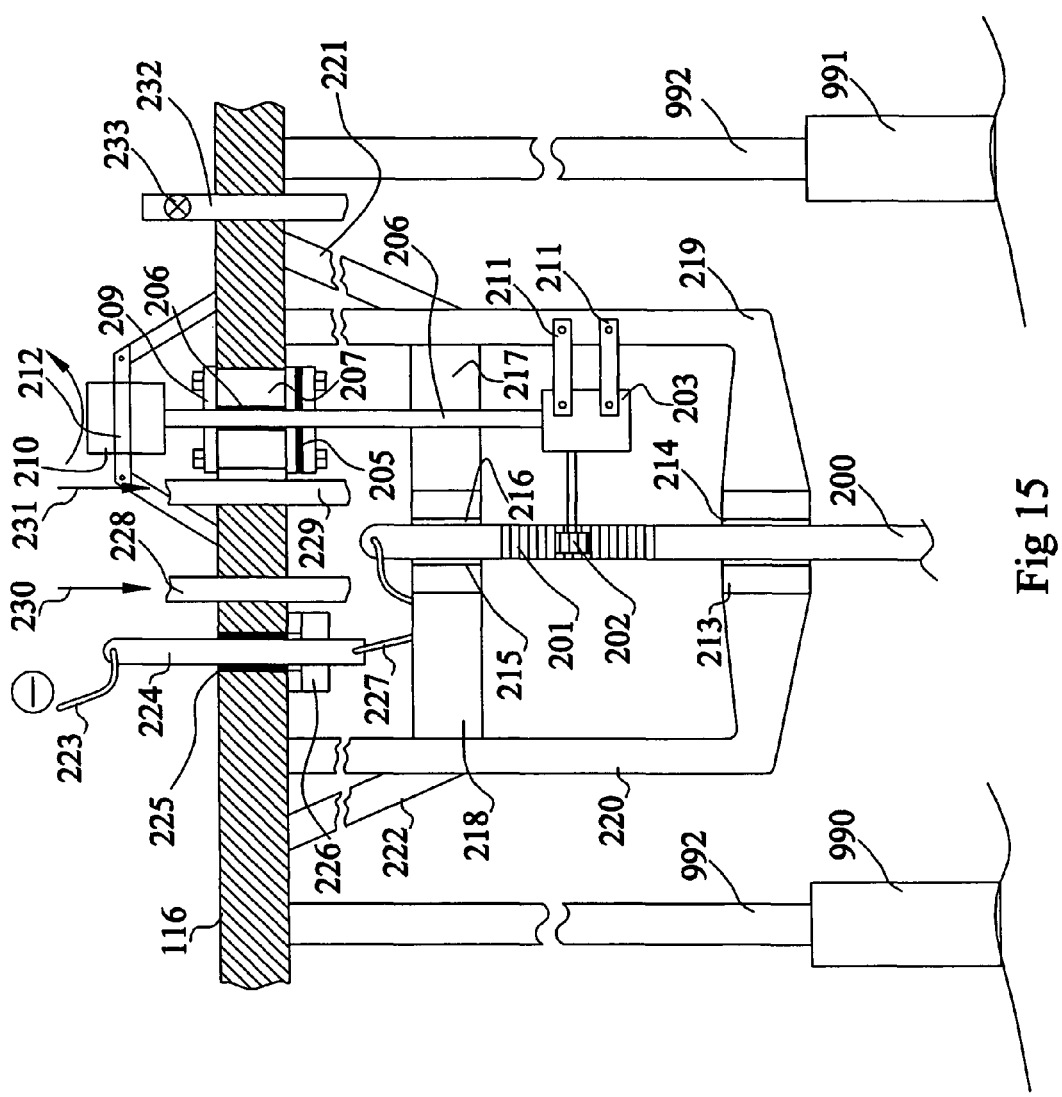
FIG. 15 shows a view of the anode assembly for the embodiment of FIG. 13.

The embodiment of FIGS. 13, 14 and 15 resolves all three of the above limitations. Its main principle is that of placing all means needed for the motion of the cathode and the anode internal in the vessel, while solely having outside the servomotors with shafts penetrating into the vessel via internals thrust bearing that, as such, permit pressures up to 5,000 psi and temperatures of the order of 1,500 degrees F., with major industrial and consumer utility. In fact, the embodiment of FIGS. 13, 14 and 15 eliminates any need of a compressor for the gaseous fuel produced since the electric arc can create the gaseous fuel all the way to the needed pressure for use in automobiles, storage, etc. Similarly, the achievement of high operating temperature that is acquires by the liquid feedstock permits the use of an external heat exchanger suitable to produce supercritical steam for powering a turbine that can produce at least in part the electric energy of the arc or for other uses.

With reference to FIG. 13, the embodiment under consideration here comprises: a 2' OD×7' length high strength steel pipe 100 suitable to withstand pressures up to 5,000 psi completed by welded hollow flanges on both sides; right hand side flange 101 suitable to withstand said pressures fastened to vessel 100 via conventional bolts with suitable gasket in between the hollow and the full flange (not shown in the figure because trivial for skilled in the art and industrially available in any case); and left hand side flange 110 fastened to the hollow flange of vessel 110 via clamp 112 operated with any of the industrially available hydraulic means suitable to withstand said internal pressure and not indicated in the figures because trivial for the skilled in the art and industrially available in any case.

Vessel 100 houses in its interior cathode 7 essentially similar to that of the preceding embodiment and sustained in a structure essentially similar to that of FIGS. 4 and 5 and not repeated here for simplicity, with all internal mechanism for the horizontal motion of said cathode 7 described in detail in FIG. 14 below. Vessel 100 is completed with vertical anode assembly 115 described in detail in FIG. 15 below, as well as with vertical 2' OD×5' high tower 118 for the collection and partial filtering of the gaseous fuel produced, said tower 118 being completed with flange 300 fastened to tower 18 with means similar to those of flange 110, labyrinth 121 for the passage of the gaseous fuel, and its exit through pipe 126. The embodiment is filled with the selected liquid feedstock up to level 124 as shown in the figure; the gaseous fuel is produced by the electric arc through gap 49, it reaches the surface via bubbles 125, passes through blades 122 of labyrinth 121 as well as through sponges 123 and exit along direction 127 at the selected operating pressure. In the recirculating mode for the total elimination of the liquid feedstock, called Total Mode, the liquid feedstock is removed from vessel 100 via lower discharge 60 and then forced through the arc via a pump 113 in direction 114 passing said liquid feedstock through flange 116 and then through PlasmaArcFlow pipes as described in the preceding embodiment.

This preferred embodiment is completed by the level tower consisting of a high pressure stainless steel pipe 128 connected to Vessel 100 via ports 131, 132 through flanges 301, 302 and closed by stainless steel flanges 129,130. Floater 133 equipped with magnet then sends the signal of the level of the liquid feedstock to an outside sensor bar 134 with a read out of the level that is electronically connected to the automatic controls. When the liquid feedstock is consumed below a pre-set minimal level generally 5" over gap 49, the automatic control refills the vessel 100 through port 135 via high pressure pump and hoses connected to an outside tank of said liquid feedstock at atmospheric pressure (external system not shown in the figure because trivial for the skilled in the art and industrially available in any case). Numerous alternative means are industrially available for sensing the level of the liquid feedstock. One of them particularly suited for very high pressures operates via ultrasound, with a sensor placed in flange 116 and connected to the automatic controls.

FIG. 14 depicts the internal means to control the horizontal motion of cathode 7, said means being all fastened to flange 110 for their entire removal from the interior of vessel 100 for inspection and service via the sled of FIG. 5, said means comprises: 2" OD copper rod 150 connected to bars 14 of cathode 7, whose length is double the length of the anode, plus length for driving the latter, support and electrical connection for a total of about 100"; rake 151 fastened to said rod 150 via conventional screws, pinion 153 acting on said rake 151, right angle reduction box 154 connected via shaft 156 to external servomotor 158 via a trust, pressure and temperature resistant assembly including trust bearing 157, bushing 183 and external cup 184, bracket 159 securely locking servomotor 158 to flange 110; said copper rod 150 being sustained by two 5" OF 5" long steel bushings 162,164 housing bushings 163,165 in teflon or equivalent for proper sliding action on rod 150 as well as electric insulation; said steel bushing 164 being fastened to frame 160 and bushing 162 being fastened to the same frame via brackets 166,167, said frame 160 being, in turn, welded to flange 110 jointly with supports 161 for structural strength as shown; electric power being delivered to rod 150 via external 2" OD copper rod 169 continuing in the interior with a 5" OD 1" thick internal flange and a 2" OD copper extension fastened to flange 110 via bushing 170 with external lid 380; a flexible 60" long cable 168 delivering the positive polarity from the external copper rod 169 to the end of the horizontally moving copper rod 150, as shown. An alternative embodiment not shown in the figure because trivial for the skilled in the art is given by steel bushings 162,164 housing linear bearing acting on copper rod 150, said bushing being connected to frame 160 via temperature and pressure resistant electric insulators, such as phenolic flanged.

FIG. 14 shows the configuration when cathode 7 is at its maximal position on the right hand side of vessel 100. Consequently, the clearance between the top of copper rod 150 and flange 110 is given by the entire horizontal displacement of the cathode 7 under the anode 35 plus at least 3" of clearance from said top of copper rod 150 and flange 110 for electric insulation. At the initiation of the arc, external servomotor 158 activates pinion 153 in such a way that rake 151 moves to the left at the approximate very low rate of about 24" per hour to allow full incandescence, until the copper rod 150 reaches the maximal position to the left. Automatic inversion of the preceding horizontal motion of rod 150 allows for continuous operations until the entire consumable 9" out of the 10" height of cathode 7 is consumed, at which point operations are stopped by skirts 41, 42 of FIG. 8 hitting the bottom of frame 10 OF FIG. 4.

FIG. 15 depicts means for the motion of the anode required to activate, maintain and optimize the electric arc, said means being all fastened to flange 116 for their entire removal from vessel 100 for inspection and service, and comprising: 2" OD copper rod 200 fastened to the anode assembly of FIGS. 7, 8 and 9 not repeated here for simplicity, said copper rod 200 having the length of the consumable cathode, plus the consumable length of the anode, plus the lengths for driving, support and electrical connections for a total length of about 50"; copper rod 200 being completed by rake 201, pinion 202, and right angle reduction box 203 connected to external servomotor 210 via shaft 204 and trust, pressure and temperature resistant means comprising trust bearing 209 bushing 208 and seals 205, external servomotor 210 being fastened to flange 116 via brackets 212 for stability of operation; said copper rod 200 being supported by two steel bushings 213,215 incorporating bushings 214,216 in teflon or equivalent for the proper sliding action of rod 200; as for electric insulation, bushing 213 being directly welded to carbon steel frame comprising symmetric arcs 219,220, bushing 215 being welded to frame 219,220 via steel brackets 217,218, frame 219,220 being completed with supports 221,222 all welded to flange 116 for structural stability; the negative polarity being delivered to copper rod 200 via external 2" OD copper shaft 224 continuing in the interior with a 5" OD 1" thick copper flange and an interior 2" OD copper shaft as shown, sealing occurring via phenolic bushing 225 and gasket 226, an internal flexible copper cable 227 in the total length of 20" delivering the negative polarity from external copper rod 224 to the top of the vertically moving copper rod 200.

The anode assembly under consideration is completed by 2" OD pipes 228,229 passing through flange 116 to deliver the flow of the liquid feedstock to pipes 45,46 of FIG. 8 via flexible interconnecting hoses not shown in the figures because trivial to the skilled in the art; said anode assembly being completed by port 232 with valve 233 connected to the automatic control for remote removal of the internal pressure of vessel 100 needed for safety prior to service. FIG. 15 shows the positioning of the assembly for new cathode 7 and anode 25 prior to consumption, in which case the top of the copper rod 200 has about 3" clearance from the internal surface of flange 116 for electrical insulation; servomotor 210 then moves pinion 202 that, in turn, moves rake 201 downward as the electrodes consume during operations, for the total allowed consumption of 9" for the cathode 7 and 6" for the anode 35, following which total consumption, electrodes are replaced and operations resume as in FIG. 15.

FIG. 15 also shows hydraulic pistons 990,991 located in the outside of pipe 115 that lift flange 116 via vertical 050" OD steel rod 992,993 all the way upward so as to expose the entire anode assembly of FIG. 15, of course, after its fastening to pipe 15 has been removed. Various alternatives are also possible, such as equivalent mechanical means based on levers powered by electric motors that can equally perform the same function. These alternative means are not depicted because trivial for the skilled in the art. This additional apparatus essentially allow the entire embodiment herein considered to be operated and serviced by one single technician without the use of a fork lift or other equipment because the embodiment incorporates horizontal rails for the easy removal of flange 110 and related cathode assembly, while the hydraulic or mechanical lift mechanism of the anode assembly herein considered avoid the use of a fork lift.

Figure 16:
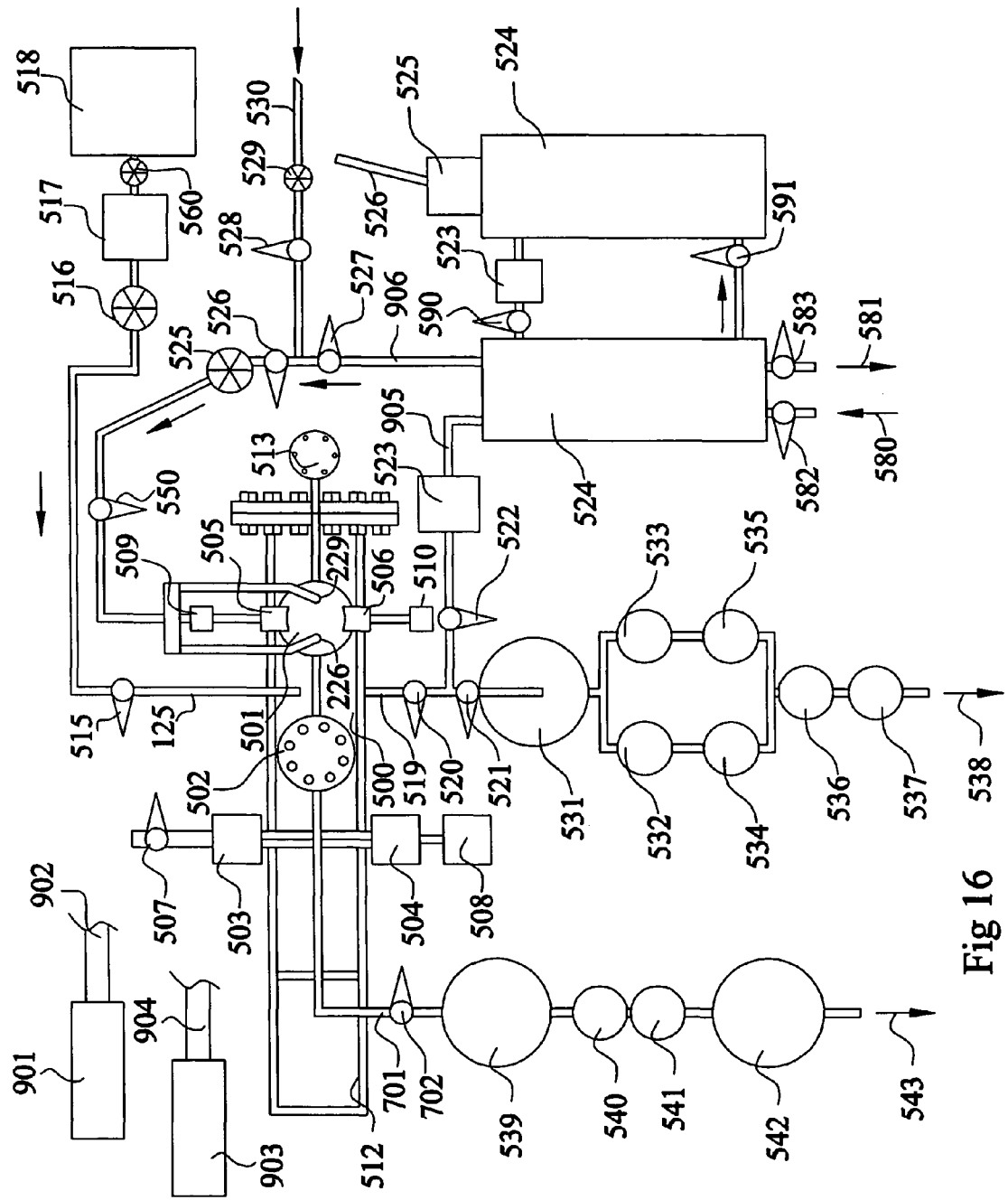
FIG. 16 shows a schematic drawing of one example of the complete apparatus.

FIG. 16 provides a schematic diagram or plan view of the preferred embodiment comprising: vessel 500; anode tower 501 with the internal anode assembly of FIG. 15; tower 502 for the release of the produced gaseous fuel including pipe 118 and labyrinth 121; hydraulic clamps 503,504 for cathode flange 110 and hydraulic clamps 505,506 for anode flange 116, with corresponding hydraulic commands 507,508,509, 510; U railings 511,512 for the support of flange 110 when completely extracted from vessel 500 as in FIG. 5; means 513 for sensing the level of the liquid feedstock.

The fundamental PlasmaArcFlow system for the complete elimination of the liquid feedstock, called Total Mode, comprises along the direction of flow: pipe 519 for removal of the liquid feedstock from vessel 500, subsequent T-shape piping with valves 520, 521,522, of which for the recirculation mode valve 521 is closed and valves 520,522 are open; high pressure and temperature pump 523 capable of delivering at least 100 gallons per minutes (gpm); heat exchanger 523 to dissipate the heat produced; T piping with valves 526,527,528 of which valve 528 must be closed for the mode herein considered and valves 526,527 must be open; strainer assembly 525 for the periodic removal of solid deposits, composed of two or more strainers with bypasses so that when one strainer is open for the removal of solids, the other strainer works to prevent halting of operations; subsequent additional T-piping with valves 550,551,552 that should be all open for the mode wherein considered, valves 551,552 being used for controlling the flow through the arc as well as its preferred direction from one side or the other of both sides of the arc as depicted in FIG. 8. In this way, the liquid feedstock is removed from vessel 500 at the desired temperature not to exceed 1,500 degrees F., circulates through the heat exchanger 524 where it is cooled down to 300 degrees F. and it is flown again though the arc in a continuously recirculating mode.

FIG. 16 also depicts the automatic refill station that is activated when level sensor 513 signals that the liquid feedstock has reached the preset minimal value generally given by a minimum of 15" liquid feedstock over the arc to assure its submerged nature. In this case, the automatic control depicted below activates high pressure pump 517 sucking the liquid feedstock from the external tank 518 and strainer preventing the entrance or introduction of solids over a preset size of about ⅛" for the embodiment herein considered and pumps it at pressure sufficient to overcome the internal operating pressure through additional safety strainer 516, valve 515 that must be open for the operation herein considered, and ending in pipe 125 of FIG. 13. After the level of the liquid feedstock has reached the maximal present value, generally consisting of 10" below flange 116, the automatic controls halt automatically the refill. In this way, the embodiment herein depicted can operate continuously 24 hours per day with great industrial and consumer utility.

The primary source of energy of the preferred embodiment is not the electric energy used by the arc, but instead the combustion of carbon in the plasma surrounding the electric arc. In fact, said plasma comprises mostly ionized atoms of carbon, oxygen and hydrogen in the presence traversed by the electric arc that triggers a large number of physical and chemical reactions at the particle, atomic and nuclear levels, including the synthesis of CO, that is one of the most esoenergetic reactions known to man since it releases 255 Kcal/mole, the synthesis of H2 releasing 110 Kcal/mole, the synthesis of CO2 releasing 84 Kcal/mole, the synthesis of H2O releasing 55 Kcal/mole, and other esoenergetic reactions, as a result of which the energy released by said physical and chemical reactions is at least 30 times bigger then the electric energy of the arc. In different terms, the invention herein depicted essentially consists of a new, very clean and efficient combustion of carbon, since said combustion occurs without any release of contaminants in the atmosphere, and it is dramatically more efficient than conventional combustions, for instance, because in the latter there is not creation of H2 and H2O.

The very large energy created by the above physical and chemical reactions is absorbed by the liquid feedstock in the form of usable heat that can be utilized in a number of way, such as heating water via its release into heat exchanger 524 via inlet pipe 580 and outlet pipe 581, with related valves 582,583 that must be open for this use or otherwise closed. The utilization of said heat herein referred is that of the generation of electric current 526 produced by an electric generator 525 powered by a turbine that, in turn, is powered by the steam produced by the heat exchanger 524 via incoming pipe 531 and return pipe 532 with pump 523 and related valves 590,591 that must be open for the function under consideration.

The above physical and chemical reactions increase with the increase of the operating pressure because the creation of the gaseous fuel by the electric arc occurs with a change in volume from liquid to gas of about 1,000 to one. Consequently, the electric arc traverses the gap mostly within the gas it produces rather than within the liquid. With the increase of the pressure the size of the gas bubbles decreases with the consequential increase of the travel of the electric arc within the liquid feedstock and consequential increase of the efficiency of the apparatus, including the increase of the usable heat.

In addition to the pressure the usable heat produced also depends on the type of pressure. In fact, the electric arc produces tree different combinations of C and O carbon, the first with single bond C—O, the second with the double bond C═O and the third with the triple bond, the latter being the conventional CO, namely, the synthesis with the largest production of heat. The increase of pressure decreases the percentage of C—O and C═O in favor of CO, thus enhancing the production of heat. For any given pressure, the heat produced can also be enhanced via the use of impact pressures, namely, instantaneous increase of pressures that cause C—O and C═O to become CO, plus cause additional physical and chemical esoenergetic reaction. For this reason, the high pressure embodiment of FIG. 16 is further equipped with apparatus consisting of a piston equipped with a motor and connected to the interior of vessel 500 and capable of causing an increase of the internal pressure of at least 30% of its value within 0.01 seconds thus producing the needed impact pressure as defined above.

The alternative use of the apparatus is the continuous flow of biocontaminated waters through the arc, their sterilization and subsequent filtration in one single passage called Linear mode. For this use, valve 515 for the automatic refill must be closed and the related pump 517 must be disabled or disconnected by the automatic controls; valves 522 and valve 527 for the recirculation of the liquid feedstock must be closed and the heat exchanger disconnected since there is no appreciable creation of heat in one single passage of the liquid feedstock through the electric arc; valves 526 and 525 must be open to allow the biocontaminated waters to flow through pipe 530 in the indicated direction, pass through strainer 529 for the removal of solid over ⅛" in size and forced to pass through PlasmaArcFlow pipes 226, 229 by pump 700. The sterilized liquid then exit vessel 500 through pipe 519 and it is first treated by the centrifuge 531 that can be a disc, decanter, belt or other separator depending on the concentration of the carbonized solids; the remaining liquid feedstock may still contain undesired contaminants in suspension as well as in solution and, therefore, it is passed through two perlite filters 532,533 one in effluent mode and the other in backwash mode to allow continuous operation, then through two charcoal filters 534,535, also one in effluent mode and the other in backwash mode, then a ionic separator 536 for the reduction of metals down to allowed values, and then through a final station 537 using ultraviolet rays to assure that the final effluent waters exiting through port 538 not only meet the stringiest environmental requirements, but are also absolutely sterile.

FIG. 16 also include a plan view of the station for the collection and filtering of the gaseous fuel produced consisting of gas release tower 502 discharging the gaseous fuel through pipe 701 and valve 702 that must be open during any operation. Said gaseous fuel is then released into expansion tank 539, then passed through micrometric filter 540, and finally through backpressure regulator 541 that sets the operating pressure of the apparatus, usually set at 5,000 psi so as to allow refill of automotive pressure tanks and storage tanks without any use of compressors. All gaseous fuel in excess of said preset operating pressure is then released into compensating tank 542 and then exits through port 543 for the preferred use. The size of tanks 539,542 varies dramatically for the intended use. For instance, in the event continuous overnight is desired without releasing the gaseous fuel, said tanks can consists of one or more cascades of high pressure bottles. On the contrary, in the event the produced gaseous fuel is continuously used, for instance, to produce electricity by powering an electric generator not shown in the figure because trivial for the skilled in the art, said tanks 539,542 can be given by 100 gallons high pressure tanks. The apparatus herein considered is then completed by 100 Kw AC-DC converter 901 delivering the negative polarity to the anode and the positive polarity to the cathode via electric wires 902.

A crucial part for consumer and industrial utility is the completion of the embodiments of this invention with automatic control housed in panel 903 with electric wires 904 connected to the various components identified above, which controls comprises the control of the electric arc, as well as various auxiliary services and operations. The automatic control of the electric arc comprises the following three main functions:

1) Initiation of the arc. This function can only be efficiently done for submerged arcs via a short caused by the physical contact of the anode 35 on the cathode 7 and ensuing initiation of the incandescence needed for operation. The initiation of the arc is achieved by the automatic control with the downward motion of anode rod 200 according to a speed that can he optimized via a variable parameter, until a torque sensor identifies said physical contact between anode and cathode, said torque being also variable via a suitable additional parameter for adjustment to different pressures and other factors. Said automatic control then maintain the short for the desired duration, also adjustable via another parameter and generally of the duration of 1 second, after which the automatic control reverse the downward motion of rod 200 up to a gap at which there is a voltage that can also be optimized for different liquids via another variable parameter ranging from 28 volts for water base liquid wastes to 35 volts for oil waste at 100 Kw operations, with corresponding voltage, and therefore gap increases for bigger powers.

2) Maintain constant said base voltage of 28 or 34 Volts. This second function is achieved via micrometric motions of pinion 202 via servomotor 210 such that, when said base voltage decreases, pinion 202 moves rod 200 upward and vice versa. Since electric arcs are never stable when inspected under periods of time of the order of microseconds, the effective control of the base voltage requires the automatic control to be equipped with an averaging function, generally implemented electronically via a Fourier transform, according to which the actual voltage sensed by the automatic control is the average over a period of the order of hundreds of seconds and also adjustable according to an additional parameter for optimization. The efficient automatic controls require an additional parameter characterizing the admitted variation of the voltage, which parameter is also variable for optimization and/or desired stability and generally varies between plus or minus 1% and 5% of the base voltage. In this way, when the variation of the voltage is within the admitted variation, no correction of the gap is implemented by servomotor 210, and corrections are implemented only when the variation of the base voltage has the admitted variation or more.

3) Optimizing the operating voltage. The efficiency of the embodiment, defined as the ratio between the volume of gaseous fuel produced and the used electric energy, increases with the increase of the voltage of the electric arc, because of the corresponding increase of the gap and consequential increase of the travel of the electric arc within the liquid feedstock. Consequently, the achievement of a stable voltage is basically insufficient for industrial or consumer utility because, even though fully stable, that voltage could be much lower than possible, resulting in a low efficiency. Hence, the automatic controls of the preferred embodiment are additionally equipped with the capability of automatically seeking the biggest possible voltage whose variation is within the percentage set in the preceding function. For instance, suppose that said variation is set at plus or minus 2%. Then the function herein considered is based on the increase of the gap with corresponding increase of the voltage up to the value for which the voltage variation is bigger than 2% at which point the automatic controls invert their action and decrease the gap down to the maximal voltage at which there is the maximal variation of 2%. Said optimization function is complemented with an additional parameter setting the frequency of the optimization process, such as every 30 seconds.

Besides the above three basic functions, the embodiment herein presented is equipped with the additional automatic control of the level of the liquid feedstock inside vessel 500 for the so-called Total Mode as described above. Another automatic control is needed for the processing of city, farm or ship sewage in the so-called Linear Mode described above. The automatic control for the Linear Mode essentially control the flow of the sewage through pipes 45, 46 to be that according the specification of the selected filtration equipment, while jointly controlling the flow of the sterilized sewage out of vessel 500 into the selected filtration equipment, in such a way to maintain a continuous balance of incoming and outgoing flow.

An additional function of the controls is that of continuously monitoring all primary functions, including pressure, temperature, flow, etc. preferably via multiple sensors per each function, automatic shut-down of all operation in the event any function is not conform with the pre-set specifications of the embodiment, and alerting the operator of said shut-down via visual, sonic and paging alarms. The automatic controls herein considered can be additionally equipped with a modem connection to the internet permitting the monitoring of all functions at any desired distance, including intercontinental distances. Finally, whenever the apparatus of this invention is used at pressure bigger than 30 psi, the apparatus must be operated in the outside under suitable protection, all controls have to be inside a building at a distance, and the apparatus can be approached by technicians only following the remote discharge of the internal pressure via electronically operated valve 233. The apparatus is then completed by numerous pressure sensors located in strategic points, such as on flange 116, pipe 512, heat exchanger 524, etc., various temperature sensors located in strategic points, such as in vessel 500, heat exchanger 524, pipe 512, etc., and various flow sensors also located in strategic points such as in pipes 905, 906,125,538, 643, etc. Needless to say, additional embodiments are those of vessels comprising more than one PlasmaArcFlow assemblies as in FIGS. 7, 8 and 9.

It should be noted that the embodiments of the present invention work not only for water-base or oil-base liquid waste, but also for ordinary tap, well, lake, pond or river water, in which case the carbon missing in the liquid feedstock and needed to reach a stable combustible fuel is provided by the combustible carbon electrodes. Additionally, whenever fresh water is used as liquid feedstock, it is possible to add coal reduced to a powdery form with micrometric grains of the order of 0.006" in size, thus reducing the consumption of the electrodes. The processing of oil base liquid feedstock, including automotive or cooking or other oil waste, as well as crude oil, requires the addition of water base liquids in the ratio of one barrel of oil with two barrels of water base liquids or fresh water. This is due to the fact that oils contain no oxygen, thus resulting in a gaseous fuel that is very contaminant. On the contrary, the indicated addition of fresh water causes the gaseous fuel to have at least 65% hydrogen and at least 22% oxygen, resulting in a very clean burning combustible fuel. Additionally, the embodiment of this invention can equally use seawater as liquid feedstock, under the addition of a suitable electrically insulating coat on all internal components, said coating being not identified in the figures because trivial for the skilled in the art. Finally, there are reasons to expect that radioactive liquids can be stimulated to decay when its atoms are ionized and exposed to the extremely intense electric and magnetic fields at atomic distances from electric arcs.

Therefore, the embodiment of this invention can work for any desired "liquid" hereinafter referred to water-base wastes, oil-base waste, crude oil, fresh water, seawater and other liquids because there exist no liquid molecule in nature that cannot be decomposed by the electric arc.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

I claim:

1. An apparatus for making a combustible gas comprising:
a pressure and temperature resistant metal vessel adapted to be filled with a liquid and the metal vessel further comprising in an interior of said vessel at least one submerged electric arc between a negatively charged, carbon base anode arranged to move in a first set of directions acting on a positively charged, carbon base cathode arranged to move in directions perpendicular to said first set of directions,
means for moving the anode in the first set of directions toward and away from the cathode;
means for alternatively moving the cathode in the directions perpendicular to the first set of directions;
said vessel being equipped with means for delivering a DC electric current to said anode and cathode, said means for delivering the DC electric current including copper holders adapted for minimizing the electric resistance between the delivery of the current and the electric arc, wherein long operating life is achieved via the anode being non-consuming acting on the cathode while minimizing the loss of power due to the electric resistance of carbon electrodes,
wherein an incandescence, which is caused by the electric arc, of an interface area between said anode and said cathode is enclosed on all sides by temperature resistant electrically insulating skirts, except for clearances suitable for the flow of said liquid through the electric arc and the exit of said liquid through an enclosed area formed by said insulating skirts,
wherein a combustible gas produced by said submerged electric arc acting on said liquid bubbles to the surface of said liquid for collection,
wherein physical and chemical esoenergetic reactions caused by the electric arc generate heat acquired by said liquid, and
wherein solid residues settle and accumulate in strainers placed along a liquid flow and are periodically collected.

2. The apparatus according to claim 1, further comprising:
electronic controls for initiating, maintaining and optimizing the electric arc via the motion of the anode toward or away from the cathode.

3. The apparatus according to claim 2, wherein the DC electric current is pulsating with a frequency that is a submultiple of a resonating frequency of the liquid.

4. The apparatus according to claim 1, further comprising:
electronic means for automatically moving the cathode at a minimal speed sufficient to maintain incandescence.

5. The apparatus according to claim 4, further comprising:
a flange for easiness of removal, inspection and service of the apparatus, the positive polarity of said means for delivering the the DC current and the means for alternatively moving the cathode being fastened thereto; and
railings in mechanical communication with the flange for the sliding removal of the flange incorporating said cathode.

6. The apparatus according to claim 1, further comprising:
means for providing an immediate increase in operating pressure of the apparatus.

7. The apparatus according to claim 1, wherein said means for delivering the DC electric current includes the negative polarity and the means for moving the anode are incorporated through a second flange.

8. The apparatus according to claim 7, further comprising:
means for removing said second flange.

9. The apparatus according to claim 1, further comprising:
hydraulic means for the rapid and automatic removal of the cathode and the anode.

10. The apparatus according to claim 1, wherein the negative polarity and the positive polarity of the means for delivering the DC electric current are delivered through copper rods passing through seals housed in the respective flanges.

11. The apparatus according to claim 1, wherein the means for moving the anode and the means for moving the cathode are internal to the vessel so as to allow high operating pressures and temperature.

12. The apparatus according to claim 1, further comprising:
means for flowing the liquid through the electric arc while compensate automatically for the variation of the location of the arc due to electrode consumption.

13. The apparatus according to claim 1, further comprising:
means for monitoring the level of said liquid.

14. The apparatus according to claim 13, further comprising:
means for automatically refilling said liquid following its consumption.

15. The apparatus according to claim 1, further comprising:
means for removing liquid residues from the gas produced and returning said liquid residues to said vessel.

16. The apparatus according to claim 1, further comprising:
means for flowing said liquid through an external heat exchanger to produce steam for generating electricity.

* * * * *